US012539856B2

(12) United States Patent
Saito et al.

(10) Patent No.: US 12,539,856 B2
(45) Date of Patent: Feb. 3, 2026

(54) VEHICLE CONTROL DEVICE

(71) Applicant: HITACHI ASTEMO, LTD., Hitachinaka (JP)

(72) Inventors: Takayuki Saito, Tokyo (JP); Masashi Seimiya, Tokyo (JP); Taku Takahama, Tokyo (JP); Keisuke Takeuchi, Tokyo (JP); Yuta Tsurumoto, Tokyo (JP); Seiya Ishii, Tokyo (JP)

(73) Assignee: HITACHI ASTEMO, LTD.

( * ) Notice: Subject to any disclaimer, the term of this patent is extended or adjusted under 35 U.S.C. 154(b) by 133 days.

(21) Appl. No.: 18/553,288

(22) PCT Filed: Feb. 28, 2022

(86) PCT No.: PCT/JP2022/008421
§ 371 (c)(1),
(2) Date: Sep. 29, 2023

(87) PCT Pub. No.: WO2022/224587
PCT Pub. Date: Oct. 27, 2022

(65) Prior Publication Data
US 2024/0174230 A1    May 30, 2024

(30) Foreign Application Priority Data
Apr. 20, 2021 (JP) ................................. 2021-070919

(51) Int. Cl.
*H04W 4/46* (2018.01)
*B60W 30/14* (2006.01)
(Continued)

(52) U.S. Cl.
CPC .......... *B60W 30/143* (2013.01); *B60W 30/16* (2013.01); *G06V 20/58* (2022.01);
(Continued)

(58) Field of Classification Search
CPC ............... B60W 30/143; B60W 30/16; B60W 2420/403; B60W 2552/53;
(Continued)

(56) References Cited

U.S. PATENT DOCUMENTS

2020/0086869 A1    3/2020 Oguro et al.
2021/0107482 A1*   4/2021 Uematsu .................. G08G 1/00

FOREIGN PATENT DOCUMENTS

| JP | 2017030435 A | * | 2/2017 | |
| JP | 2018-039318 A | | 3/2018 | |
| JP | 2019218011 A | * | 12/2019 | .......... B60W 30/143 |
| JP | 2020066327 A | * | 4/2020 | |
| WO | WO-2018/216123 A1 | | 11/2018 | |
| WO | WO-2019225265 A1 | * | 11/2019 | |

(Continued)

OTHER PUBLICATIONS

Nakamura Atsuya, Feb. 9, 2017, English Machine Translation_ JP2017-030435A provided by Patent Translate by EPO and Google (Year: 2017).*

(Continued)

*Primary Examiner* — Ashley L Redhead, Jr.
(74) *Attorney, Agent, or Firm* — Foley & Lardner LLP

(57) ABSTRACT

An object of the present invention is to provide a vehicle control device capable of improving ride comfort of a driver. A lane change detection unit 205 of a vehicle control device 200 determines a possibility of cut-in of an adjacent vehicle immediately in front of an own vehicle on the basis of an adjacent vehicle relationship value (for example, a relative speed between the own vehicle and the adjacent vehicle) in an advancing direction. An acceleration/deceleration control unit 206 corrects acceleration/deceleration of the own vehicle on the basis of the possibility of the cut-in determined on the basis of the adjacent vehicle relationship value in the advancing direction.

14 Claims, 14 Drawing Sheets

(51) Int. Cl.
*B60W 30/16* (2020.01)
*G06V 20/56* (2022.01)
*G06V 20/58* (2022.01)

(52) U.S. Cl.
CPC ............ *G06V 20/588* (2022.01); *H04W 4/46* (2018.02); *B60W 2420/403* (2013.01); *B60W 2552/53* (2020.02); *B60W 2554/4041* (2020.02); *B60W 2554/4045* (2020.02); *B60W 2554/802* (2020.02); *B60W 2556/10* (2020.02); *B60W 2556/65* (2020.02)

(58) Field of Classification Search
CPC . B60W 2554/4041; B60W 2554/4045; B60W 2554/802; B60W 2556/10; B60W 2556/65; B60W 30/095; B60W 30/0956; B60W 2554/801; B60W 2720/106; B60W 50/0097; G06V 20/58; G06V 20/588; H04W 4/46; G08G 1/167
See application file for complete search history.

(56) References Cited

OTHER PUBLICATIONS

Ueda Hiroyuki, Oct. 24, 2018, English Machine Translation_JP2020-066327A provided by Patent Translate by EPO and Google (Year: 2018).*

Kuroki Michihiro May 23, 2018, English Machine Translation_WO 2019/225265 A provided by Patent Translate by EPO and Google (Year: 2018).*

Uematsu Takumi, Jun. 22, 2018, English Machine Translation_JP 2019-218011 A A provided by Patent Translate by EPO and Google (Year: 2018).*

International Search Report with English Translation and Written Opinion of International Patent Application No. PCT/JP2022/008421 dated May 10, 2022 (10 pages).

* cited by examiner

VEHICLE CONTROL DEVICE

TECHNICAL FIELD

The present invention relates to a technique of a vehicle control device that performs driving assistance.

BACKGROUND ART

In the related art, there is a vehicle control device that controls traveling of a vehicle. The vehicle control device may have a function of adaptive cruise control (ACC) realizing a function of preceding vehicle following control for following a preceding vehicle traveling in front of an own vehicle and a function of vehicle speed control for traveling at a preset vehicle speed. During the preceding vehicle following control or the vehicle speed control of the ACC, an adjacent vehicle or a cut-in vehicle may cut in front of an own vehicle.

For example, PTL 1 discloses a technique in which, in a case where an adjacent vehicle or a cut-in vehicle cuts in between an own vehicle and a preceding vehicle, when a vehicle speed of the cut-in vehicle is higher than a vehicle speed of the own vehicle, acceleration of the own vehicle is not permitted for a predetermined time after the occurrence of the cut-in, and thus discomfort and uneasiness given to a driver is suppressed (ABSTRACT).

PTL 2 discloses a technique in which, in a case where an adjacent vehicle or a cut-in vehicle cuts in between an own vehicle and a preceding vehicle, speeds of the own vehicle and the cut-in vehicle are compared, and in a situation in which the speed of the cut-in vehicle is higher and an inter-vehicle distance gradually increases, following control for not decelerating the own vehicle is performed, so that following control suitable for a traveling behavior of the cut-in vehicle can be executed (ABSTRACT, FIG. 6).

CITATION LIST

Patent Literatures

PTL 1: JP 2018-039318 A
PTL 2: WO 2018/216123 A

SUMMARY OF INVENTION

Technical Problem

In PTLs 1 and 2, after an adjacent vehicle or a cut-in vehicle cuts in between an own vehicle and a preceding vehicle, control of the own vehicle is performed on the basis of relative speeds of the own vehicle and the cut-in vehicle. However, when the own vehicle performs inter-vehicle distance control for following the preceding vehicle, a case where the preceding vehicle is accelerated and an inter-vehicle distance from the preceding vehicle becomes longer than a target inter-vehicle distance and thus the own vehicle is accelerated to approach the target inter-vehicle distance is conceivable. In this case, it is also conceivable that the adjacent vehicle cuts in. In this case, when acceleration/deceleration of the own vehicle is controlled after the adjacent vehicle cuts in, it is conceivable that, immediately after the acceleration is increased to follow the preceding vehicle, the acceleration is decreased due to the cut-in of the adjacent vehicle, causing sudden deceleration, which may impair the ride comfort of the driver.

As described above, when an own vehicle is controlled on the basis of a relative speed between the own vehicle and a cut-in vehicle after the cut-in vehicle has cut in front of the own vehicle, sudden deceleration may occur, and the ride comfort of a driver may be impaired.

The present invention has been made in view of the above problems, and an object thereof is to provide a vehicle control device capable of improving ride comfort of a driver.

Solution to Problem

In order to achieve the above object, according to the present invention, there is provided a vehicle control device that automatically controls a speed of an own vehicle, the vehicle control device including:
a preceding vehicle relationship value detection unit that detects a preceding vehicle relationship value that is a relative relationship value in an advancing direction between a preceding vehicle traveling immediately in front of the own vehicle in an own vehicle lane in which the own vehicle is traveling and the own vehicle;
an acceleration/deceleration control unit that controls acceleration/deceleration of the own vehicle on the basis of the preceding vehicle relationship value in the advancing direction;
an adjacent vehicle relationship value detection unit that detects an adjacent vehicle relationship value that is a relative relationship value in the advancing direction between an adjacent vehicle traveling in an adjacent lane adjacent to the own vehicle lane in the same direction as the own vehicle and the own vehicle; and
a lane change detection unit that detects a lane change of the adjacent vehicle to the own vehicle lane, in which
the lane change detection unit determines a possibility of cut-in of the adjacent vehicle immediately in front of the own vehicle on the basis of the adjacent vehicle relationship value in the advancing direction, and
the acceleration/deceleration control unit corrects acceleration/deceleration of the own vehicle on the basis of the possibility of the cut-in that is determined on the basis of the adjacent vehicle relationship value in the advancing direction.

Advantageous Effects of Invention

According to the present invention, it is possible to improve ride comfort of a driver by detecting a cut-in vehicle early and suppressing sudden deceleration of an own vehicle due to a sudden decrease in an inter-vehicle distance at the time of cut-in.

Further features related to the present invention will become apparent from the description of the present specification and the accompanying drawings. Problems, configurations, and effects other than those described above will become apparent from the following description of embodiments.

DESCRIPTION OF EMBODIMENTS

A. Various Embodiments According to Present Invention

[A-1. Configuration]
(A-1-1. Configuration of Vehicle)

Figure 1:
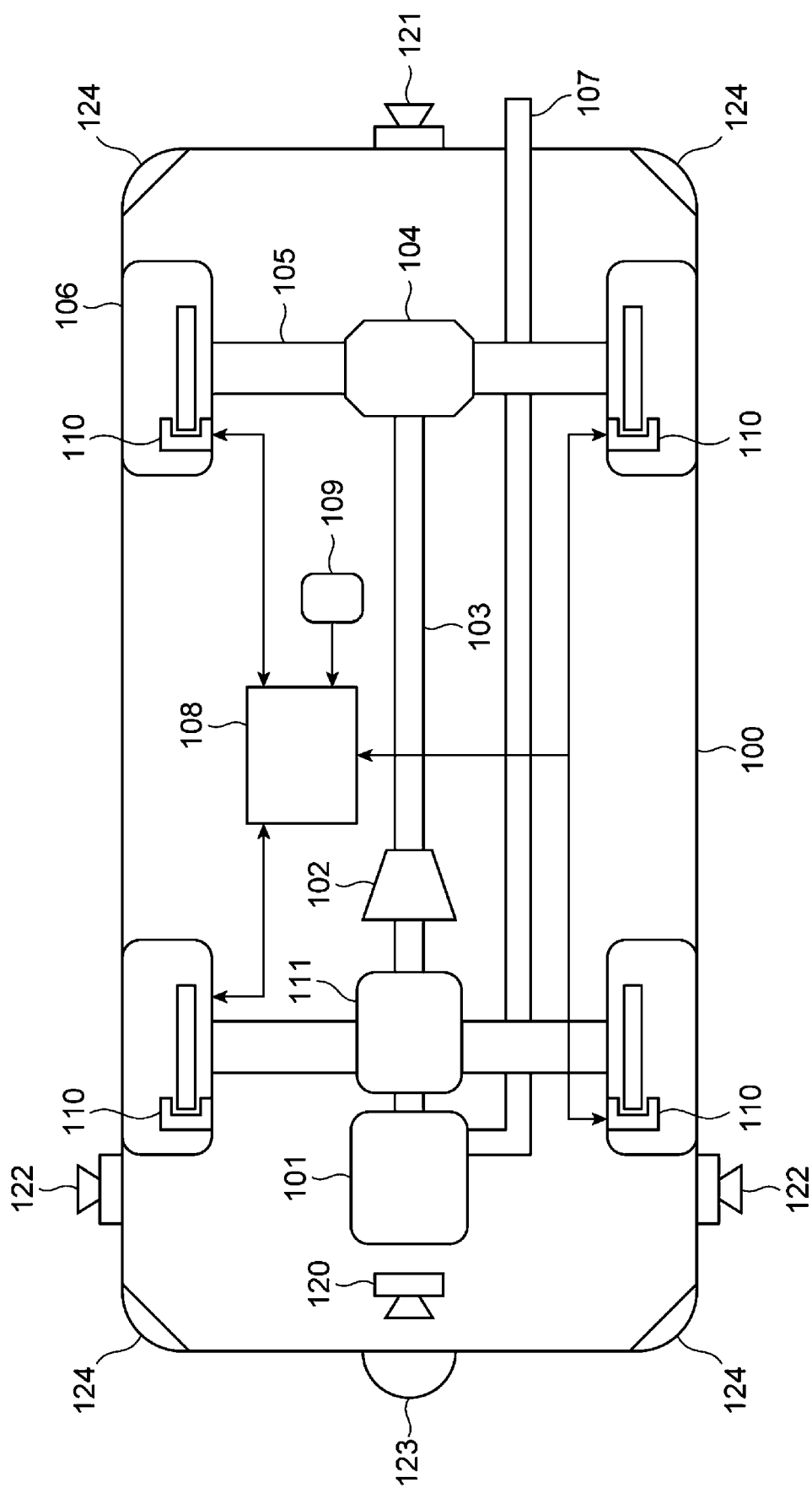
FIG. 1 is a diagram illustrating a schematic configuration of a vehicle according to an embodiment of the present invention.

FIG. 1 is a diagram illustrating a schematic configuration of a vehicle 100 according to an embodiment of the present invention. The vehicle 100 (hereinafter, also referred to as a "own vehicle 100") is a rear-wheel drive vehicle having a general configuration. As illustrated in FIG. 1, the vehicle 100 includes an engine 101, an automatic transmission 102, a propeller shaft 103, a differential gear 104, a drive shaft 105, four wheels 106, an exhaust pipe 107, a vehicle control device 108, various sensors 109, brake devices 110, and an electric power steering 111. The engine 101 is a travel power source, and is, for example, a cylinder injection type gasoline engine. The brake device 110 includes a wheel speed sensor.

The vehicle 100 is provided with devices including the vehicle control device 108 and the various sensors 109, actuators, and equipment. These devices, actuators, and equipment can exchange signals and data through an in-vehicle local area network (LAN) or controller area network (CAN) communication. The vehicle control device 108 obtains information outside the vehicle 100 from the sensors 109, and transmits a command value for realizing control such as automated driving to the engine 101, the brake devices 110, the electric power steering 111, and the like. The wheel speed sensor of the brake device 110 generates a pulse waveform in accordance with rotation of the wheel 106 and transmits the pulse waveform to the vehicle control device 108.

The vehicle 100 is provided with imaging sensors 120, 121, and 122 and distance sensors 123 and 124. The imaging sensor 120 is disposed on a front part of the vehicle 100 and images a front side of the vehicle 100. The imaging sensor 121 is disposed on a rear part of the vehicle 100 and images a rear view of the vehicle 100. The imaging sensor 122 is disposed on a side part of the vehicle 100 and images a lateral view of the vehicle 100. The imaging sensors 120, 121, and 122 include a monocular camera or a stereo camera using a plurality of monocular cameras. The imaging sensors 120, 121, and 122 can detect an object near the vehicle 100 and a component of a road environment such as a white line.

The distance sensor 123 is disposed on the front part of the vehicle 100 and detects a distance (long distance) to an object in front of the vehicle 100. The distance sensor 123 may be, for example, a laser radar. The distance sensors 124 are disposed on the left front part, the right front part, the left rear part, and the right rear part of the vehicle 100, and detect a distance (short distance) to an object near the vehicle 100. The distance sensor 124 may be, for example, an ultrasonic sensor.

The type, attachment position, number, and the like of each of the sensors 120, 121, 122, 123, and 124 can be appropriately changed according to applications, specifications, and the like of the vehicle 100. For example, as the type of sensor, a LiDAR may be used in addition to or in place of any of the imaging sensor, the laser radar, and the ultrasonic sensor. Detection content of the sensors 120, 121, 122, 123, and 124 is supplied to the vehicle control device 108. Each of the sensors 120, 121, 122, 123, and 124 may be positioned as a part of the various sensors 109.

Note that the vehicle 100 in FIG. 1 is an example of a vehicle to which the present invention can be applied, and a configuration of the vehicle 100 is not restricted thereto. For example, a vehicle employing a continuously variable transmission (CVT) instead of the automatic transmission 102 may be used. The travel power source may be not only a gasoline engine but also a diesel engine, a natural gas engine, an electric motor, or the like.

(A-1-2. Configuration of Vehicle Control Device and Periphery Thereof)

Figure 2:
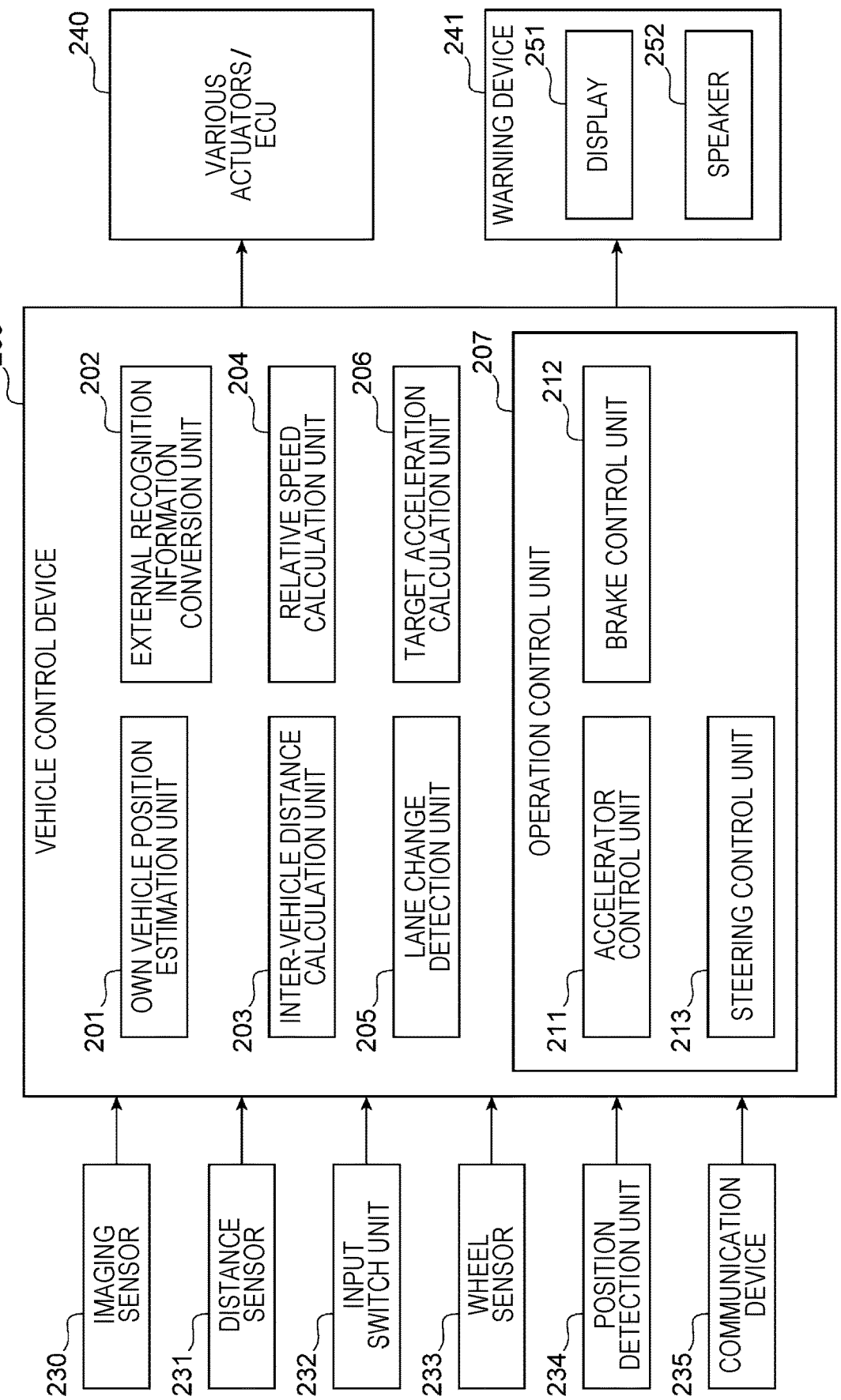
FIG. 2 is a functional block diagram of a vehicle control device and a periphery thereof according to the embodiment of the present invention.

FIG. 2 is a functional block diagram of a vehicle control device 200 and a periphery thereof according to an embodiment of the present invention. The vehicle control device 200 in FIG. 2 may be used as, for example, the vehicle control device 108 of the vehicle 100 in FIG. 1. As illustrated in FIG. 2, the vehicle control device 200 receives inputs from an imaging sensor 230, a distance sensor 231, an input switch unit 232, a wheel sensor 233, a position detector 234, and a communication device 235. The vehicle control device 200 sends to outputs the various actuators/ECUs 240 and a warning device 241.

The imaging sensor 230 includes, for example, the imaging sensors 120, 121, and 122 in FIG. 1. The input from the imaging sensor 230 is used to detect a white line or an object in front of the own vehicle, and detect a distance or a speed between the own vehicle and the object from a distinction between an own vehicle traveling lane and another lane adjacent to the own vehicle traveling lane, or a difference in object information detected by the left and right imaging sensors. Imaging data of the imaging sensor 230 is input to the vehicle control device 200. The imaging sensor 230 can also be used as a distance sensor 231 that will be described later.

The distance sensor 231 includes, for example, the distance sensors 123 and 124 or the LiDAR in FIG. 1. The distance sensor is used to transmit millimeter waves or radio waves toward the surroundings of the own vehicle and receive a reflected wave to detect the distance to the object. The distance data from the distance sensor 231 is input to the vehicle control device 200.

By using the imaging sensor 230 and the distance sensor 231, it is possible to detect the vicinity of the own vehicle and a distant location from the own vehicle. The sensors can detect a direction indicator of an adjacent vehicle that will be described later, and used to receive a cut-in request.

The input switch unit 232 is, for example, a dedicated mechanical switch provided near a driver's seat. The input switch unit 232 may be a graphical user interface (GUI) switch or the like. The input switch unit 232 receives an instruction to start constant speed traveling by controlling the vehicle at a predetermined target vehicle speed and an instruction to stop constant speed traveling through a user operation.

The wheel sensor 233 includes a wheel speed sensor that is attached to each wheel of the own vehicle and detects a rotation speed of the wheel and a controller that generates a vehicle speed signal by integrating detection values detected by the wheel speed sensor. Vehicle speed signal data from the wheel sensor 233 is input to the vehicle control device 200.

The position detector 234 includes an azimuth sensor that measures an azimuth in front of the own vehicle and a GPS receiver for a global positioning system (GPS) that measures a position of the vehicle on the basis of radio waves from satellites.

The communication device 235 is a device that is mounted outside or inside the own vehicle, is used when inter-vehicle communication between the own vehicle and an adjacent vehicle that will be described later or road-to-vehicle communication in an interchange or a construction section is performed, and receives a cut-in request of the adjacent vehicle.

The various actuators/ECUs 240 may be any known actuators, and include, for example, mechanical elements (actuators) such as an accelerator pedal that operates a driving force, a brake pedal that operates a braking force, a parking brake, a steering wheel that operates a progress direction of the vehicle, and a shift lever that operates an advancing direction of the vehicle, and various electronic control units (ECUs) that control these constituents.

The warning device 241 notifies a user of detection of an adjacent vehicle, a possibility of cut-in of an adjacent vehicle, cut-in detection an of adjacent vehicle, calculation of a target acceleration of the own vehicle 100 determined according to a behavior of a target object, decrease of a target vehicle speed, stop of vehicle control, and the like, which will be described later. For example, the warning device 241 provides notifications of target vehicle speed decrease and vehicle control stop by using a display 251 or a speaker 252. The notification may be provided by using vibration or the like of each mirror or the steering wheel.

Next, a configuration of the vehicle control device 200 will be described. As illustrated in FIG. 2, the vehicle control device 200 includes an own vehicle position estimation unit 201, an external recognition information conversion unit 202, an inter-vehicle distance calculation unit 203, a relative speed calculation unit 204, a lane change detection unit 205, a target acceleration calculation unit 206, and an operation control unit 207.

The own vehicle position estimation unit 201 calculates and estimates a position where the own vehicle is traveling with respect to a travel lane from, for example, information output from the position detector 234, the wheel sensor 233, the distance sensor 231, or the imaging sensor 230.

The external recognition information conversion unit 202 converts information regarding an object and the surrounding environment detected by the distance sensor 231 and the imaging sensor 230 and a positional relationship of the own vehicle output from the own vehicle position estimation unit 201 into a coordinate system.

The inter-vehicle distance calculation unit 203 calculates distances between an object detected by the various sensors and the own vehicle in the advancing direction and the lateral direction. Consequently, the distance in the advancing direction and the distance in the lateral direction from not only a vehicle in front of the own vehicle but also a vehicle in the adjacent lane are calculated. The same applies to a vehicle behind the own vehicle.

The relative speed calculation unit 204 calculates a relative speed between an object detected by the various sensors and the own vehicle. Consequently, a relative speed in the advancing direction and a relative speed in the lateral direction with respect to not only a vehicle in front of the own vehicle but also a vehicle in the adjacent lane are calculated. The same applies to a vehicle behind the own vehicle.

The lane change detection unit 205 detects a relative relationship between a vehicle in the adjacent lane which is a target object and the own vehicle, detected by the various sensors, the inter-vehicle distance calculation unit 203, and the relative speed calculation unit 204, and determines a possibility that the adjacent vehicle changes the lane to (or cuts in) an own vehicle lane. The determination of a possibility of cut-in is performed from a behavior of the adjacent vehicle. For example, in a case where the adjacent vehicle traveling in the adjacent lane stays slightly in front of the own vehicle (in a case where a relative position between the adjacent vehicle and the own vehicle in the advancing direction is substantially constant), it can be determined that there is a possibility (or high possibility) of cut-in. Such determination may be performed on the basis of whether or not a relative position, a relative speed, or a relative distance, or a relative acceleration between the adjacent vehicle and the own vehicle in the advancing direction is within a predetermined range.

In a case where it is determined that there is a possibility that the adjacent vehicle cuts in, the target acceleration calculation unit 206 that will be described later corrects a target acceleration. For example, in a case where the own vehicle performs inter-vehicle distance control with respect to a preceding vehicle, the correction of the target acceleration may include switching to vehicle speed control, reduction (deceleration) of the target acceleration, or acceleration restriction. The inter-vehicle distance control is control for controlling acceleration/deceleration of the own vehicle such that an inter-vehicle distance between the own vehicle and the preceding vehicle coincides with a target inter-vehicle distance (or maintained within a target inter-vehicle distance region), and will also be referred to as preceding vehicle following control. The vehicle speed control is control for controlling acceleration/deceleration of the own vehicle such that a vehicle speed of the own vehicle coincides with the target vehicle speed (or maintained within the target vehicle speed range), and will also be referred to as constant speed automated driving.

In a case where the adjacent vehicle starts to cut in to the own vehicle lane or after the adjacent vehicle has cut in, the target acceleration of the own vehicle may be corrected by the target acceleration calculation unit 206 on the basis of whether or not a value of the relative position, the relative distance, the relative speed, or the relative acceleration in the advancing direction or the lateral direction of the adjacent vehicle or the cut-in vehicle is within a certain range.

The operation control unit 207 calculates target values for controlling the various actuators/ECUs 240 when performing the preceding vehicle following control or the constant speed automated driving, and outputs a control instruction. The operation control unit 207 includes an accelerator control unit 211 that controls acceleration of the own vehicle, a brake control unit 212 that controls braking of the own vehicle, and a steering control unit 213 that controls steering of the own vehicle.

[A-2. Control]
(A-2-1. Description of Situation)

Figure 3:
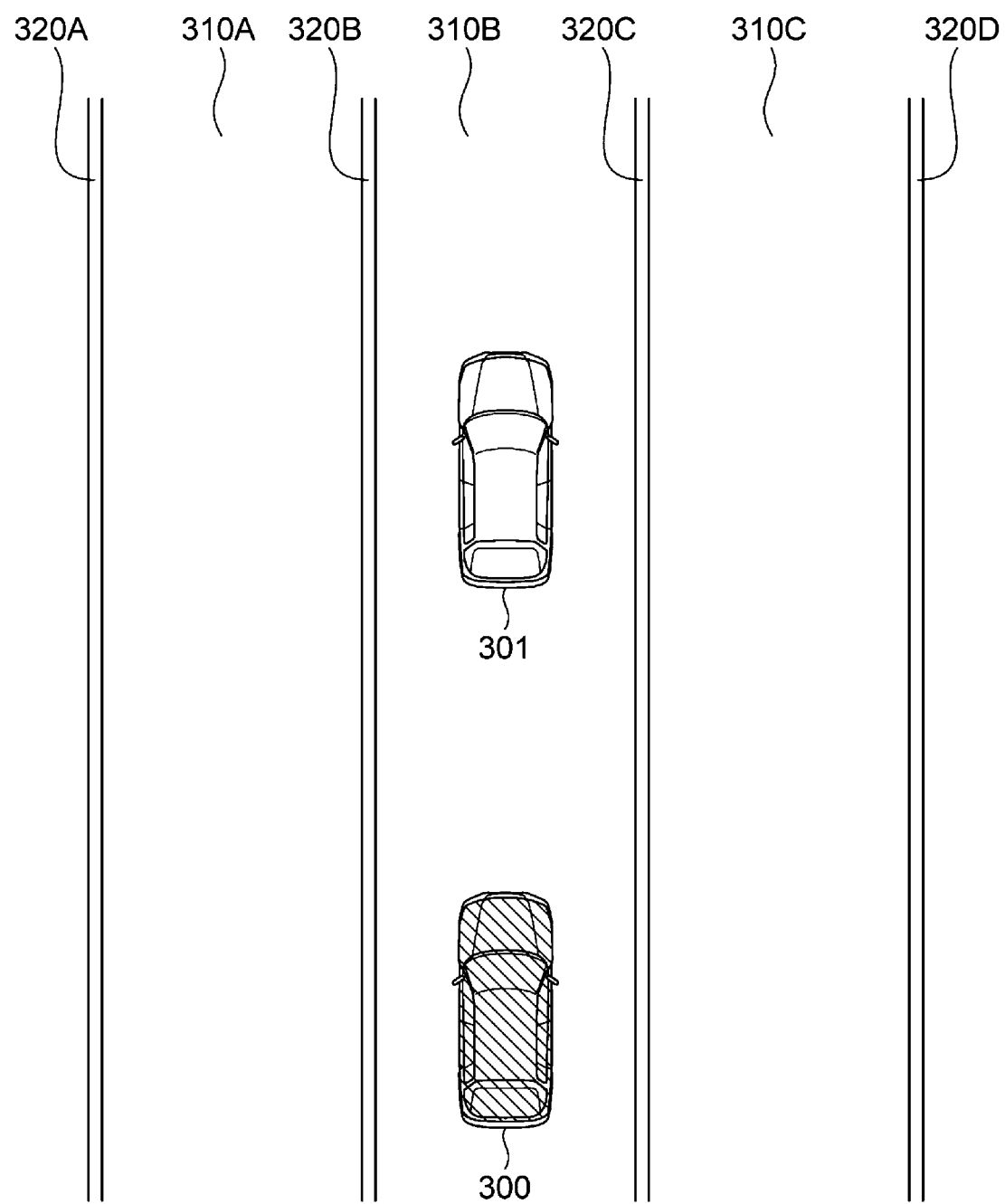
FIG. 3 is a diagram illustrating a first situation in which a vehicle according to the embodiment of the present invention is traveling.

Next, a first situation in which a vehicle according to the embodiment of the present invention is traveling will be described with reference to FIG. 3. In FIG. 3, a vehicle 300 (hereinafter, also be referred to as an "own vehicle 300") on which the vehicle control device according to the present invention is mounted and a vehicle 301 (hereinafter, also be referred to as a "preceding vehicle 301") traveling immediately in front of the own vehicle 300 are traveling.

A road on which the own vehicle 300 and the preceding vehicle 301 are traveling includes three lanes 310A, 310B, and 310C. Hereinafter, among the lanes, the lane 310B in which the own vehicle 300 and the preceding vehicle 301 are traveling will also be referred to as an own vehicle lane 310B. The lanes 310A and 310C adjacent to the own vehicle lane 310B will also be referred to as adjacent lanes 310A and 310C. The adjacent lane 310A is defined by white lines 320A and 320B, the own vehicle lane 310B is defined by white lines 320B and 320C, and the adjacent lane 310C is defined by white lines 320C and 320D. The number of lanes included in the road is not restricted to three, and may be two or four or more (the same applies to FIG. 4 and the like).

The own vehicle 300 is executing adaptive cruise control (ACC). That is, in a case where the preceding vehicle 301 is present, the own vehicle 300 executes the preceding vehicle following control with respect to the preceding vehicle 301. In a case where there is no preceding vehicle 301 or in a case where a predetermined condition is satisfied even if there is the preceding vehicle 301, the own vehicle 300 may perform constant speed traveling control of traveling at a vehicle speed that is freely set by a driver.

Figure 4:
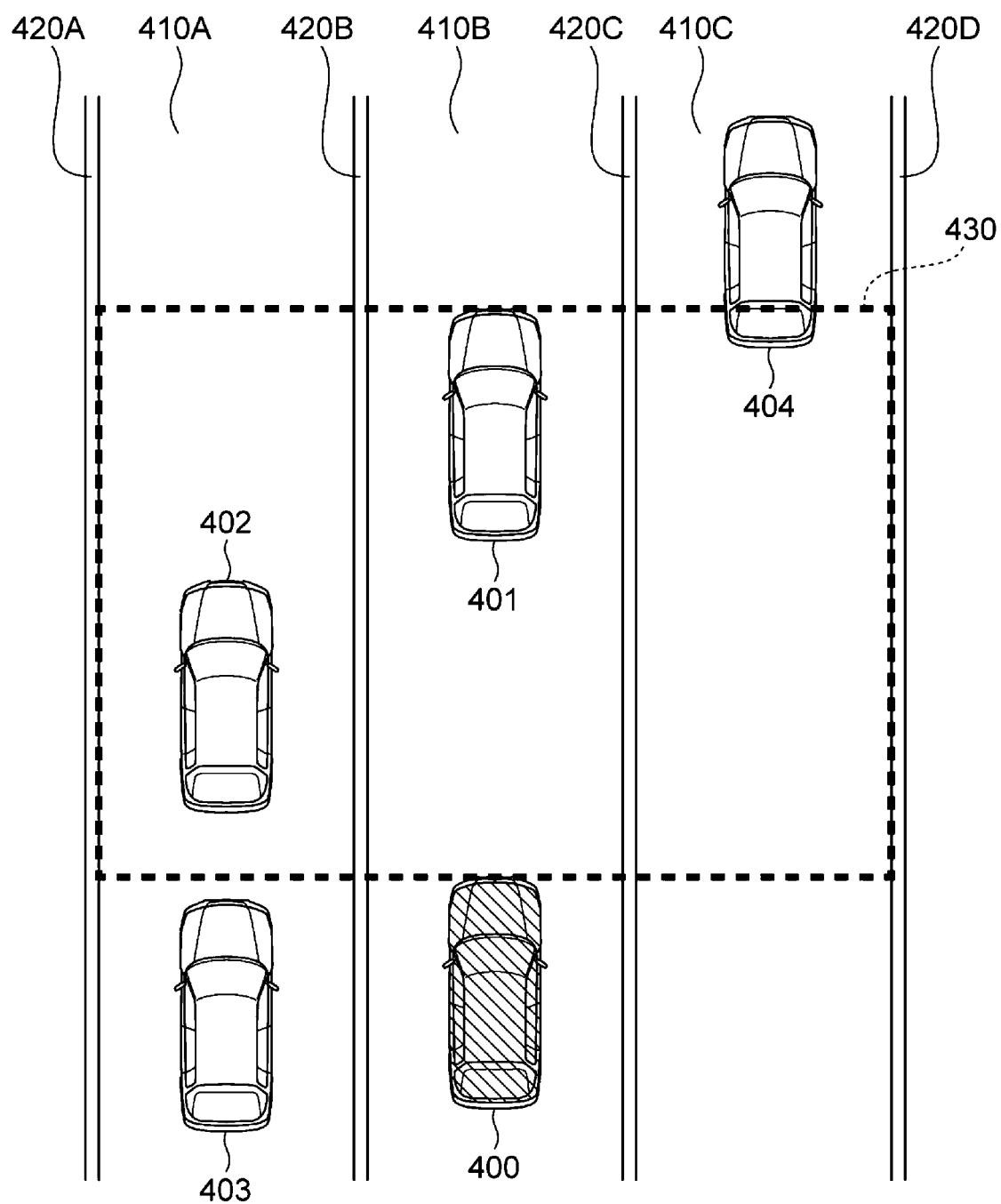
FIG. 4 is a diagram illustrating a second situation in which the vehicle according to the embodiment of the present invention is traveling.

Next, a second situation in which a vehicle according to the embodiment of the present invention is traveling will be described with reference to FIG. 4. In FIG. 4, a vehicle 400 (hereinafter, also be referred to as an "own vehicle 400") on which the vehicle control device according to the present invention is mounted and vehicles 401, 402, 403, and 404 (hereinafter, also be referred to as "other vehicles 401, 402, 403, and 404") traveling immediately in front of or beside the own vehicle 400 are traveling.

A road on which the own vehicle 400 and the other vehicles 401 to 404 are traveling includes three lanes 410A, 410B, and 410C. Hereinafter, among the lanes, the lane 410B in which the own vehicle 400 and the other vehicle 401 are traveling will also be referred to as an own vehicle lane 410B. The lanes 410A and 410C adjacent to the own vehicle lane 410B will also be referred to as adjacent lanes 410A and 410C. The adjacent lane 410A is defined by white lines 420A and 420B, the own vehicle lane 410B is defined by white lines 420B and 420C, and the adjacent lane 410C is defined by white lines 420C and 420D. The other vehicle 401 traveling immediately in front of the own vehicle 400 in the own vehicle lane 410B will also be referred to as a preceding vehicle 401, and the other vehicles 402 to 404 traveling in the adjacent lanes 410A and 410C will also be referred to as adjacent vehicles 402 to 404.

The own vehicle 400 is executing ACC. That is, in a case where the preceding vehicle 401 is present, the own vehicle 400 executes the preceding vehicle following control with respect to the preceding vehicle 401. In a case where there is no preceding vehicle 401 or in a case where a predetermined condition is satisfied even if there is the preceding vehicle 401, the own vehicle 400 may perform constant speed traveling control of traveling at a vehicle speed that is freely set by a driver.

During the execution of ACC, the vehicle control device of the own vehicle 400 uses a monitoring region 430. The monitoring region 430 is a detection region of an adjacent vehicle (for example, the adjacent vehicles 402 to 404) and a cut-in vehicle at the time of executing ACC. In the example in FIG. 4, a range (advancing direction range) of the monitoring region 430 in the advancing direction is set from the front end of the own vehicle 400 to the front end of the preceding vehicle 401. A range (lateral direction range) of the monitoring region 430 in the lateral direction is set between the outer white lines 420A and 420D of the adjacent lanes 410A and 410C.

The advancing direction range and the lateral direction range of the monitoring region 430 are not restricted to the above. For example, the advancing direction range may be from the rear end of the own vehicle 400 to the front end of the preceding vehicle 401, or from the rear end of the own vehicle 400 to the rear end of the preceding vehicle 401. The rearmost position of the advancing direction range may be set to a position behind the rear end of the own vehicle 400. In this case, in a case where the current various sensors cannot detect a vehicle (another vehicle) behind the rear end of the own vehicle 400, a sensor may be added to detect a vehicle in the own vehicle lane 410B or the adjacent lanes 410A and 410C behind the rear end of the own vehicle 400.

The lateral direction range of the monitoring region 430 may be changed according to the number of adjacent lanes. That is, in a case where there are adjacent lanes 410A and 410C on both sides of the own vehicle lane 410B, the lateral direction range may be between the respective outer white lines 420A and 420D of the adjacent lanes 410A and 410C. In a case where there is an adjacent lane only on one side of the own vehicle lane 410B (for example, in a case where there is only the adjacent lane 410A), the lateral direction range may be between the respective outer white lines 420A and 420C of the adjacent lane 410A and the own vehicle lane 410B. Among the white lines 420A to 420D, a portion that cannot be imaged by the imaging sensor 120 (FIG. 1) on the front part (imaging impossible portion) may be detected or estimated on the basis of a continuous behavior (in the advancing direction, in the lateral direction, and the like) of the own vehicle 400 or comparison between the past and current front images.

(A-2-2. Outline of Acceleration/Deceleration Control Accompanying Cut-In)

Next, acceleration/deceleration control of the own vehicle will be described. As described above, ACC including the preceding vehicle following control (inter-vehicle distance control) and the constant speed automated driving (vehicle speed control) can be performed in the own vehicle. In the present invention, for example, the acceleration/deceleration control of the own vehicle is switched or corrected in a case where the adjacent vehicle starts to cut in to the own vehicle lane during the preceding vehicle following control or on the basis of a possibility of cut-in.

Specifically, when a lateral direction position of the adjacent vehicle present in the adjacent vehicle detection range (such as 430 in FIG. 4) exceeds a white line threshold value (described later) or when a cut-in request (including a request using vehicle-to-vehicle communication and a request using a direction indicator) is received from the adjacent vehicle, the vehicle control device of the own vehicle determines that the adjacent vehicle has started to cut in (details thereof will be described later with reference to FIGS. 9(A) to 14).

In a case where the adjacent vehicle traveling in the adjacent lane and present in the monitoring region maintains a relative position with the own vehicle in the advancing direction (in a case where a relative position between the adjacent vehicle and the own vehicle in the advancing direction is substantially constant), the vehicle control device of the own vehicle determines that there is a possibility (or high possibility) of cut-in. Such a determination can be performed on the basis of whether or not a relative relationship value (a relative position, a relative distance, a relative speed, or a relative acceleration) between the adjacent vehicle and the own vehicle in the advancing direction is within a predetermined range (details thereof will be described later with reference to FIGS. 5 to 8).

Hereinafter, the acceleration/deceleration control based on a lateral direction position of the adjacent vehicle present in the monitoring region (such as 430 in FIG. 4) will also be referred to as first cut-in related control. The acceleration/deceleration control based on a cut-in request from the adjacent vehicle will also be referred to as second cut-in related control. The acceleration/deceleration control based on a relative relationship value (hereinafter, also referred to as an "adjacent vehicle relationship value") between the adjacent vehicle and the own vehicle in the advancing direction will also be referred to as cut-in possibility related control.

The cut-in possibility related control may be able to prepare for cut-in of the adjacent vehicle at a timing earlier than the first and second cut-in related control. On the other hand, depending on a behavior of the adjacent vehicle, it may not be possible to determine cut-in of the adjacent vehicle in the cut-in possibility related control. Therefore, by using both the cut-in possibility related control and the first and second cut-in related control, it is possible to more reliably determine cut-in of the adjacent vehicle. However, only one or two of the cut-in possibility related control and the first and second cut-in related control may be used.

(A-2-3. Cut-In Possibility Related Control (Acceleration/Deceleration Control Based on Adjacent Vehicle Relationship Value in Advancing Direction))

Next, the cut-in possibility related control will be described with reference to FIGS. 5 to 8. As described above, the cut-in possibility related control is acceleration/deceleration control based on a relative relationship value between the own vehicle and the adjacent vehicle in the advancing direction (determination of a cut-in vehicle and acceleration correction of the own vehicle).

FIGS. 5(A) to 5(D) are explanatory diagrams illustrating first to fourth states of a situation in which the cut-in possibility related control according to the embodiment of the present invention is performed. In FIGS. 5(A) to 5(D), an own vehicle 500 and other vehicles 501 and 502 are traveling in the same direction. Roads in FIGS. 5(A) to 5(D) include lanes 510A and 510B. Hereinafter, the lane 510B in which the own vehicle 500 and the other vehicle 501 are traveling will also be referred to as an own vehicle lane 510B. The lane 510A adjacent to the own vehicle lane 510B will also be referred to as an adjacent lane 510A. The adjacent lane 510A is defined by white lines 520A and 520B, and the own vehicle lane 510B is defined by white lines 520B and 520C. The other vehicle 501 traveling immediately in front of the own vehicle 500 in the own vehicle lane 510B will also be referred to as a preceding vehicle 501, and the other vehicle 502 traveling in the adjacent lane 510A will also be referred to as an adjacent vehicle 502.

In FIGS. 5(A) to 5(D), the own vehicle 500 continues ACC. In FIG. 5(A), the own vehicle 500 follows the preceding vehicle 501 according to the inter-vehicle distance control. Specifically, the vehicle control device of the own vehicle 500 controls acceleration/deceleration of the own vehicle 500 such that an inter-vehicle distance D1 between the own vehicle 500 and the preceding vehicle 501 is maintained to be a target inter-vehicle distance. The other vehicle 502 traveling in the adjacent lane 510A approaches the own vehicle 500 from behind the own vehicle 500.

The vehicle control device of the own vehicle 500 sets a monitoring region 530. In a case where the white line 520B can be detected, the vehicle control device of the own vehicle 500 sets a white line threshold value 540. The white line threshold value 540 is a threshold value (virtual white line) for determining whether or not the adjacent vehicle 502 has started to cut in to the own vehicle lane 510B. The white line threshold value 540 is inclined with respect to the white line 520B. That is, the white line threshold value 540 has a greater lateral direction offset value with respect to the white line 520B as it becomes closer to the own vehicle 500 side, and has a smaller lateral direction offset value with respect to the white line 520B as it becomes closer to the preceding vehicle 501 side. In the examples in FIGS. 5(A) to 5(D), the lateral direction offset value with respect to the white line 520B at the front end of the preceding vehicle 501 is zero (however, it need not to be zero). Alternatively, an advancing direction position where the lateral direction offset value with respect to the white line 520B becomes zero may be another place (for example, a position separated by a predetermined distance with respect to the front end or the rear end of the preceding vehicle 501). As the inclination or the lateral direction offset value of the white line threshold value 540, a specific fixed value may be used. Alternatively, the inclination or the lateral direction offset value of the white line threshold value 540 may be calculated by using a table or a map using at least one of a relative speed or a relative acceleration between the own vehicle 500 and the adjacent vehicle 502 in the advancing direction, or the inter-vehicle distance D1, a target inter-vehicle distance, or a relative distance between the own vehicle 500 and the preceding vehicle 501 in the advancing direction.

In FIG. 5(B), since the preceding vehicle 501 is accelerated while the own vehicle 500 continues the inter-vehicle distance control with respect to the preceding vehicle 501, the inter-vehicle distance D1 becomes longer than that in FIG. 5(A). Therefore, in a case where the inter-vehicle distance control is continued, the vehicle control device of the own vehicle 500 attempts to accelerate the own vehicle 500 in order to set the inter-vehicle distance D1 to the target inter-vehicle distance. On the other hand, the other vehicle 502 passes the own vehicle 500 and enters the monitoring region 530. Therefore, the vehicle control device of the own vehicle 500 determines a possibility of cut-in of the adjacent vehicle 502 by using the relative relationship value (adjacent vehicle relationship value) between the own vehicle 500 and the adjacent vehicle 502 in the advancing direction. As the adjacent vehicle relationship value, for example, a relative speed [km/h] between the own vehicle 500 and the adjacent vehicle 502 in the advancing direction is used.

In a case where the adjacent vehicle 502 is maintained at the position in FIG. 5(B) for a certain time (for example, in a case where a state in which the relative speed is zero continues for a certain time), it is considered that there is a possibility that the adjacent vehicle 502 changes the lane (cuts in) between the preceding vehicle 501 and the own vehicle 500. Therefore, in a case where the adjacent vehicle 502 is maintained at the position in FIG. 5(B) for a certain time, the vehicle control device of the own vehicle 500 stops the inter-vehicle distance control with respect to the preceding vehicle 501 and shifts to the vehicle speed control. As a result, the own vehicle 500 travels at the target speed, and the inter-vehicle distance D1 between the own vehicle 500 and the preceding vehicle 501 may deviate from the target inter-vehicle distance used in the inter-vehicle distance control.

As described above, in a case where the own vehicle 500 continues the inter-vehicle distance control with respect to the preceding vehicle 501, when the preceding vehicle 501 is accelerated and thus the inter-vehicle distance D1 becomes longer than the target inter-vehicle distance, the vehicle control device of the own vehicle 500 accelerates the own vehicle 500 such that the inter-vehicle distance D1 coincides with the target inter-vehicle distance. However, when the inter-vehicle distance control with respect to the preceding vehicle 501 is stopped and a shift to the vehicle speed control is executed, the own vehicle 500 continues constant speed traveling even if the preceding vehicle 501 is accelerated. Consequently, it is possible to prepare for cut-in of the adjacent vehicle 502.

In FIG. 5(B), the adjacent vehicle 502 does not exceed the white line threshold value 540. Whether the adjacent vehicle 502 has exceeded the white line threshold value 540 is determined by comparing a relative position between the right front corner of the adjacent vehicle 502 (one of the left front corner and the right front corner of the adjacent vehicle 502 on the white line 520B side) and the white line threshold value 540.

In FIG. 5(C), the adjacent vehicle 502 is traveling toward the own vehicle lane 510B beyond the white line threshold value 540. When the adjacent vehicle 502 exceeds the white line threshold value 540, the vehicle control device of the own vehicle 500 determines that the adjacent vehicle 502 has started a lane change to the own vehicle lane 510B (cut-in between the own vehicle 500 and the preceding vehicle 501). In this case, the vehicle control device of the own vehicle 500 sets the adjacent vehicle 502 as a new preceding vehicle and starts inter-vehicle distance control with respect to the new preceding vehicle 502. That is, the vehicle control device of the own vehicle 500 controls acceleration/deceleration of the own vehicle 500 such that the inter-vehicle distance D1 between the own vehicle 500 and the new preceding vehicle 502 is maintained to be the target inter-vehicle distance.

FIG. 5(D) illustrates a state in which the new preceding vehicle 502 (original adjacent vehicle) has completed the lane change to the own vehicle lane 510B (cut-in between the own vehicle 500 and the original preceding vehicle 501).

Figure 5:
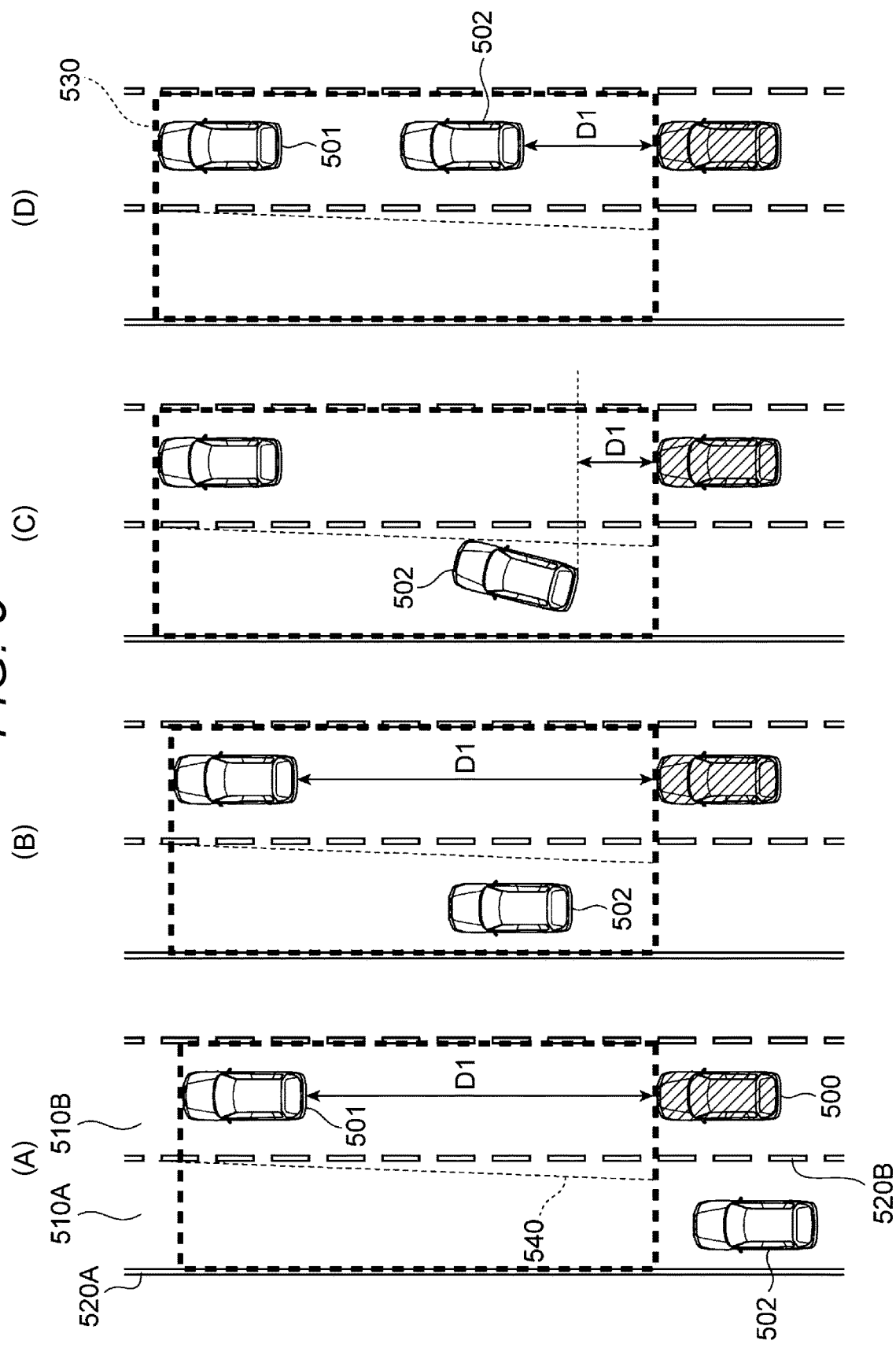
FIGS. 5(A) to 5(D) are explanatory diagrams illustrating first to fourth states of a situation in which cut-in possibility related control according to the embodiment of the present invention is performed.
Figure 6:
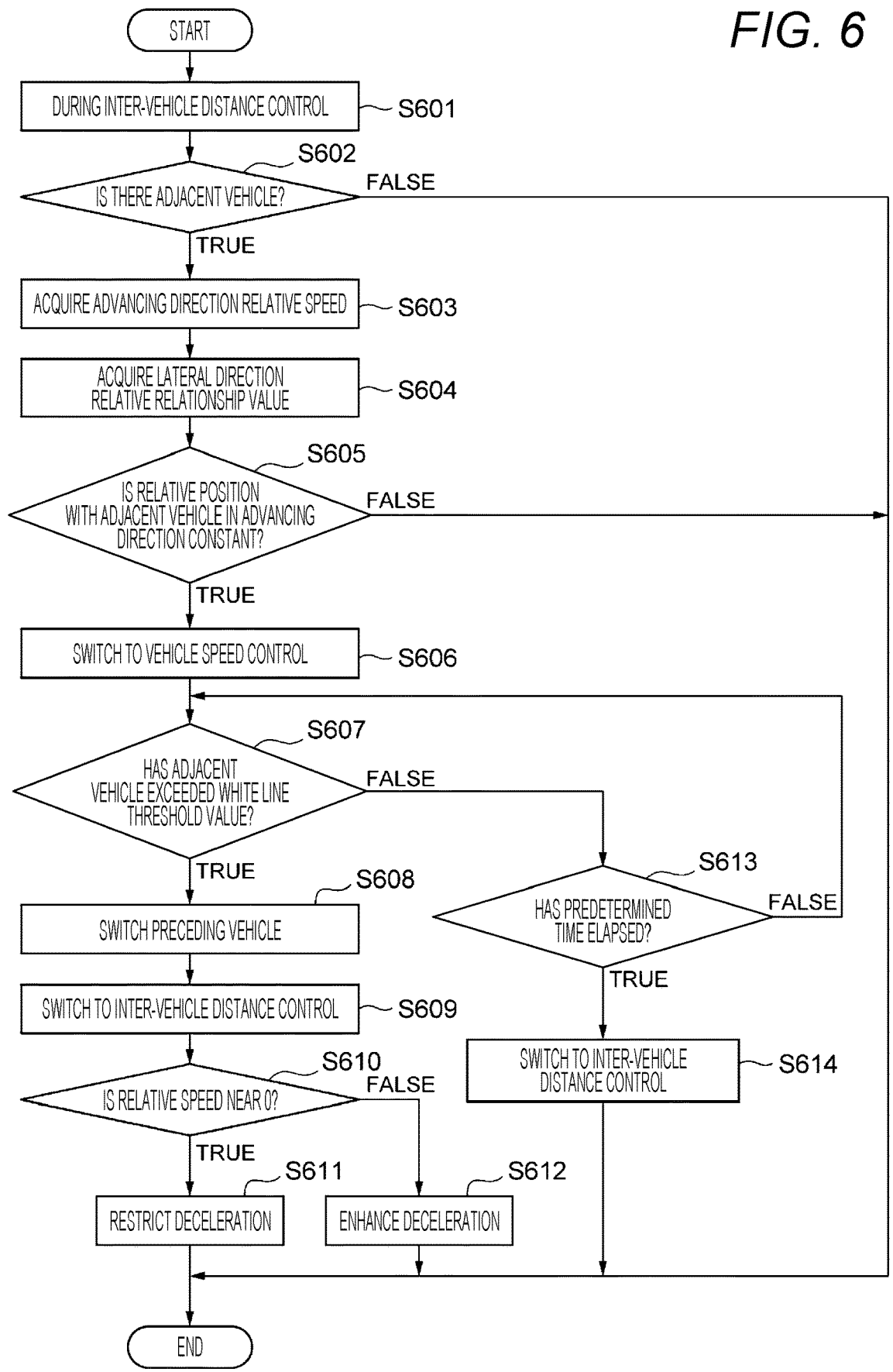
FIG. 6 is a flowchart illustrating cut-in possibility related control according to the embodiment of the present invention.

FIG. 6 is a flowchart illustrates the cut-in possibility related control according to an embodiment of the present invention. Hereinafter, each step in FIG. 6 will be described in association with FIGS. 5(A) to 5(D). In step S601, the vehicle control device of the own vehicle 500 is performing the inter-vehicle distance control of ACC (refer to FIG. 5(A)). In step S602, the vehicle control device of the own vehicle 500 determines whether there is another vehicle (adjacent vehicle) in the adjacent lane 510A and in the monitoring region 530. In a case where the adjacent vehicle is present (S602: true (TRUE)), the process proceeds to step S603. In a case where there is no adjacent vehicle (S602: false (FALSE)), determination of a cut-in vehicle and acceleration correction of the own vehicle based on the determination are not performed.

In step S603, the vehicle control device of the own vehicle 500 acquires a relative speed between the own vehicle 500 and the adjacent vehicle 502 in the advancing direction. The relative speed in the advancing direction is used in step S605 and the like that will be described later in order to determine a possibility that the adjacent vehicle 502 cuts in to the own vehicle lane 510B. As long as a possibility of cut-in of the adjacent vehicle 502 can be determined, another relative relationship value (adjacent vehicle relationship value) between the own vehicle 500 and the adjacent vehicle 502 in the advancing direction may be used instead of the relative speed in the advancing direction. As such an adjacent vehicle relationship value, for example, a relative position, a relative distance, or a relative acceleration in the advancing direction may be used. An adjacent vehicle that is a target is not restricted to one adjacent vehicle, and may be a plurality of adjacent vehicles. The relative speed may be set such that a side approaching the own vehicle 500 is negative, and a side away from the own vehicle 500 is positive, or vice versa. Although not illustrated in FIG. 6, in order to perform the inter-vehicle distance control with respect to the preceding vehicle 501, the vehicle control device of the own vehicle 500 also acquires the relative position, the relative distance, the relative speed, and the relative acceleration between the own vehicle 500 and the preceding vehicle 501 in the advancing direction.

In step S604, the vehicle control device of the own vehicle 500 acquires a relative relationship value of the adjacent vehicle 502 in the lateral direction. The relative relationship value in the lateral direction range here includes a relative position, a relative distance, a relative speed, and a relative acceleration between the own vehicle 500 and the adjacent vehicle 502, and a relative position and a relative distance between the white line 520B and the adjacent vehicle 502. An adjacent vehicle that is a target is not restricted to one adjacent vehicle, and may be a plurality of adjacent vehicles. Although not illustrated in FIG. 6, in order to perform the inter-vehicle distance control with respect to the preceding vehicle 501, the vehicle control device of the own vehicle 500 also acquires a relative position, a relative distance, a relative speed, and a relative acceleration between the own vehicle 500 and the preceding vehicle 501 in the lateral direction.

In step S605, the vehicle control device of the own vehicle 500 determines whether the relative position between the own vehicle 500 and the adjacent vehicle 502 in the advancing direction is constant. Whether or not the relative position in the advancing direction is constant is determined on the basis of whether or not a state in which the relative speed between the own vehicle 500 and the adjacent vehicle 502 in the advancing direction is 0 or within a predetermined range including 0 continues for a first predetermined time. Alternatively, whether or not the relative position in the advancing direction is constant may be determined on the basis of whether or not a state in which the relative distance between the own vehicle 500 and the adjacent vehicle 502 in the advancing direction is within a predetermined range continues for the first predetermined time. Alternatively, whether or not the relative position in the advancing direction is constant may be determined on the basis of whether or not a state in which the relative acceleration of the own vehicle 500 and the adjacent vehicle 502 in the advancing direction is 0 or within a predetermined range including 0 continues for the first predetermined time.

As the first predetermined time (first time threshold value), a specific fixed value may be used. Alternatively, the first predetermined time may be calculated by using a table or a map using at least one of the relative speed, the relative distance, or the relative acceleration between the own vehicle 500 and the adjacent vehicle 502 in the advancing direction, or the inter-vehicle distance D1 or the target inter-vehicle distance between the own vehicle 500 and the preceding vehicle 501 in the advancing direction.

Note that, in the determination of whether or not the relative position in the advancing direction is constant, two or more indexes among the relative position, the relative speed, the relative distance, and the relative acceleration in the advancing direction may be used. In this case, even in a case where one of the indexes indicates a state in which the relative position in the advancing direction is constant, in a case where another value indicates a state in which the relative position in the advancing direction is not constant, it may be determined that the relative position in the advancing direction is not constant.

In a case where the relative position between the own vehicle 500 and the adjacent vehicle 502 in the advancing direction is constant (S605: true), the process proceeds to step S606. In other cases (S605: false), determination of a cut-in vehicle and acceleration correction of the own vehicle 500 based on the determination are not performed.

In a case where the relative position between the own vehicle 500 and the adjacent vehicle 502 in the advancing direction is constant, a trigger for correcting the acceleration of the own vehicle 500 may be managed by using a flag such as a cut-in possibility flag or a first predetermined time elapse flag.

In step S606, the vehicle control device of the own vehicle 500 switches the travel control of the own vehicle 500 from the inter-vehicle distance control to the vehicle speed control. Instead of switching to the vehicle speed control, the acceleration may be made smaller than the current acceleration or the acceleration may be set to 0 [G]. After step S606, even if the preceding vehicle 501 is accelerated and the inter-vehicle distance D1 becomes longer than the target inter-vehicle distance, the own vehicle 500 continues the constant speed traveling (FIG. 5(B)). On the contrary, in a case where the preceding vehicle 501 is decelerated and the inter-vehicle distance D1 becomes shorter than the target inter-vehicle distance, although not illustrated in FIG. 6, the inter-vehicle distance control may be performed with priority over the vehicle speed control, and the own vehicle 500 may decelerate such that the inter-vehicle distance D1 from the preceding vehicle 501 becomes the target inter-vehicle distance. In other words, in step S606, the vehicle speed control may be selected in a case where the inter-vehicle distance D1 from the preceding vehicle 501 is equal to or longer than the target inter-vehicle distance, and the inter-vehicle distance control may be selected in a case where the inter-vehicle distance D1 is shorter than the target inter-vehicle distance.

In step S607, the vehicle control device of the own vehicle 500 determines whether or not the adjacent vehicle 502 exceeds the white line threshold value 540. The white line threshold value 540 is a threshold value obtained by offsetting a predetermined fixed value to the white line 520B. Alternatively, the white line threshold value 540 is a threshold value calculated by using a table, a map, or the like according to the relative speed, the inter-vehicle distance D1, the relative acceleration, or the target inter-vehicle distance between the own vehicle 500 and the preceding vehicle 501 in the advancing direction, and is determined on the basis of the relative position between the adjacent vehicle 502 and the white line threshold value 540.

In a case where the white line 520B does not exist or cannot be detected, whether the adjacent vehicle 502 has exceeded the white line threshold value 540 (or whether the adjacent vehicle 502 has started cut-in) may be determined on the basis of a relative relationship value between the adjacent vehicle 502 (another vehicle) and the own vehicle 500 in the lateral direction. As the relative relationship value between the adjacent vehicle 502 and the own vehicle 500 in the lateral direction, the inter-vehicle distance D1 between the own vehicle 500 and the preceding vehicle 501, the relative vehicle speed, or an amount of change in the relative vehicle speed within a predetermined time, or an amount of change in the inter-vehicle distance D1 within a predetermined time may be used. In a case where the adjacent vehicle 502 exceeds the white line threshold value 540 (S607: true), the process proceeds to the next step S608. In other cases (S607: false), the process proceeds to step S613.

In step S608, the vehicle control device of the own vehicle 500 switches a preceding vehicle (another vehicle immediately in front of the own vehicle 500 in the own vehicle lane 510B) from the other vehicle 501 to the other vehicle 502. That is, in a case where the adjacent vehicle 502 exceeds the white line threshold value 540, the own vehicle 500 recognizes the adjacent vehicle 502 as a cut-in vehicle or a new preceding vehicle instead of the preceding vehicle 501 that has been followed so far.

In step S609, the vehicle control device of the own vehicle 500 switches the travel control of the own vehicle 500 from the vehicle speed control to the inter-vehicle distance control. At that time, the new preceding vehicle 502 (original adjacent vehicle) is a target of the inter-vehicle distance control. In a case where the adjacent vehicle 502 cuts in and becomes a new preceding vehicle 502, it is assumed that the inter-vehicle distance D1 between the own vehicle 500 and the new preceding vehicle 502 is shorter than the target inter-vehicle distance.

In step S610, the vehicle control device of the own vehicle 500 determines whether or not the relative speed between the own vehicle 500 and the new preceding vehicle 502 in the advancing direction is 0 or near 0 (within a predetermined range including 0). In a case where the relative speed in the advancing direction is 0 or near 0 (S610: true), the process proceeds to step S611. In other cases (S610: false), the process proceeds to step S612.

In step S611, the vehicle control device of the own vehicle 500 restricts the deceleration (negative acceleration) of the own vehicle 500. As described above, in a case where the adjacent vehicle 502 cuts in and becomes a new preceding vehicle 502, the inter-vehicle distance D1 between the own vehicle 500 and the new preceding vehicle 502 is assumed to be shorter than the target inter-vehicle distance. In this state, in a case where the relative speed between the own vehicle 500 and the new preceding vehicle 502 is near 0, there is a low possibility that the own vehicle 500 and the new preceding vehicle 502 suddenly approach each other. Therefore, by restricting the deceleration, the inter-vehicle distance D1 is gradually increased. Note that the acceleration/deceleration of the own vehicle 500 may be calculated by using a table or a map using at least one of the relative speed, the inter-vehicle distance, the relative acceleration, and the target inter-vehicle distance between the own vehicle 500 and the new preceding vehicle 502 in the advancing direction.

In step S612, the vehicle control device of the own vehicle 500 enhances the deceleration. In a case where the relative speed between the own vehicle 500 and the new preceding vehicle 502 is not near 0, the inter-vehicle distance D1 between the own vehicle 500 and the new preceding vehicle 502 rapidly decreases or increases. Therefore, in order to increase the inter-vehicle distance D1 to the target inter-vehicle distance at an early stage, a larger deceleration is allowed.

In both of steps S611 and S612, in a case where the inter-vehicle distance D1 between the own vehicle 500 and the new preceding vehicle 502 reaches the target inter-vehicle distance, the inter-vehicle distance control is continued such that the state is maintained.

As described above, in a case where the adjacent vehicle 502 does not exceed the white line threshold value 540 (S607: false), the process proceeds to step S613. In step S613, the vehicle control device of the own vehicle 500 determines whether or not a second predetermined time has elapsed after true in step S605. In a case where the second predetermined time has elapsed (S613: true), it is determined that there is no possibility of cut-in of the adjacent vehicle 502, and the process proceeds to step S614. In other cases (S613: false), the process returns to step S607. As the second predetermined time (second time threshold value), a specific fixed value may be used. Alternatively, the second predetermined time may be calculated by using a table or a map using at least one of the relative speed, the relative distance, or the relative acceleration between the own vehicle 500 and the adjacent vehicle 502 in the advancing direction, or the inter-vehicle distance D1 or the target inter-vehicle distance between the own vehicle 500 and the preceding vehicle 501 in the advancing direction.

In step S614, the vehicle control device of the own vehicle 500 switches the travel control of the own vehicle 500 from the vehicle speed control to the inter-vehicle distance control. At that time, the preceding vehicle 501 that is the same target of the previous inter-vehicle distance control is set as the target of the inter-vehicle distance control.

Figure 7:
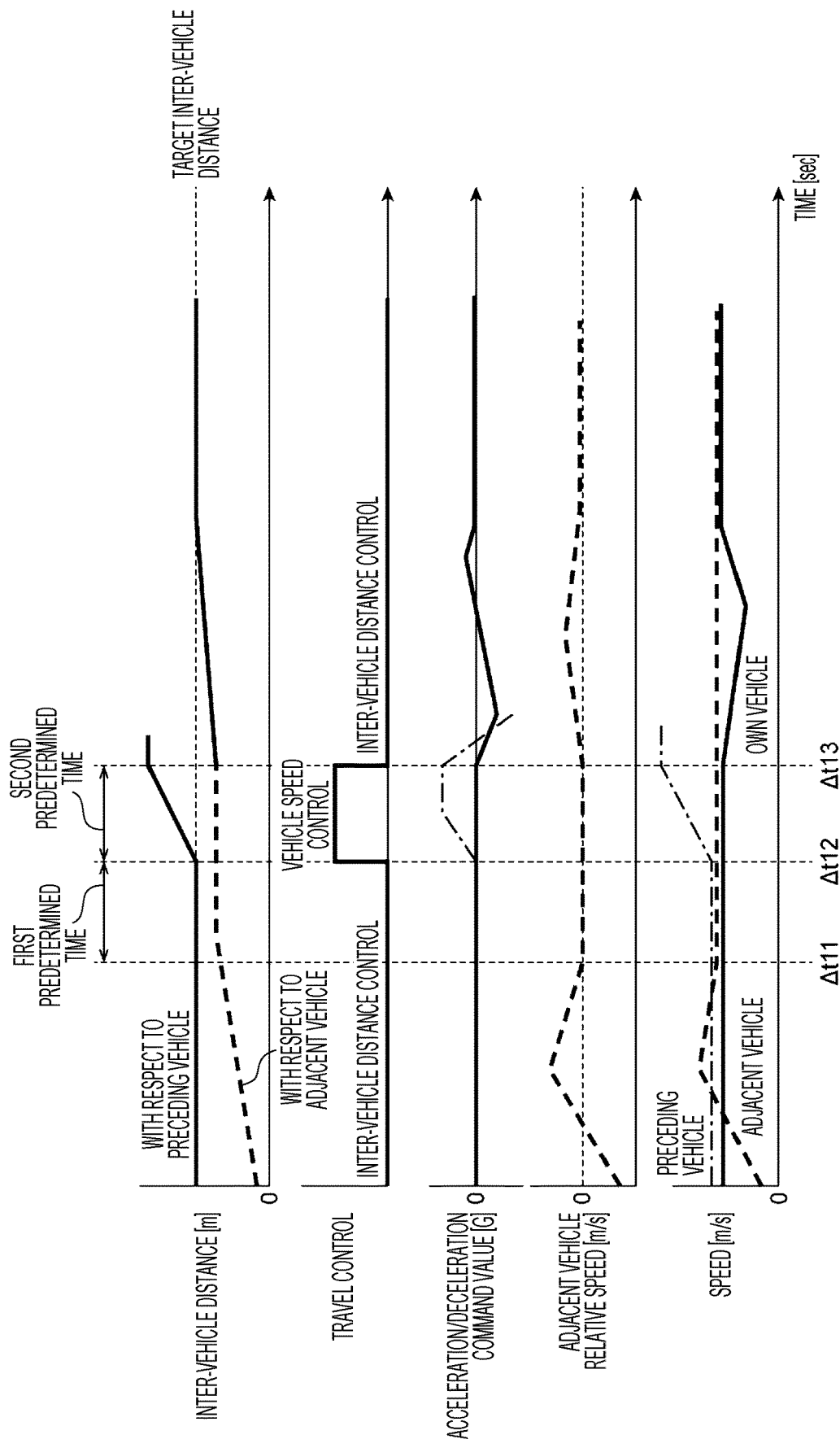
FIG. 7 is a first timing chart of execution of the cut-in possibility related control according to the embodiment of the present invention.

FIG. 7 is a first timing chart of execution of the cut-in possibility related control according to the embodiment of the present invention. Hereinafter, in the description in FIG. 7, the description will be made in association with FIGS. 5(A) to 5(D) and FIG. 6. In the example in FIG. 7, in ACC of the own vehicle 500, the preceding vehicle is switched from the other vehicle 501 to the other vehicle 502.

Before time point Δt11 in FIG. 7, the inter-vehicle distance control with respect to the preceding vehicle 501 is being performed (S601 in FIG. 6). At time point Δt11, the relative speed between the own vehicle 500 and the adjacent vehicle 502 in the advancing direction becomes 0 (or is included within a predetermined range including 0). Thereafter, a state in which the relative speed is zero (or a state included in a predetermined range including zero) continues.

Time point Δt12 is a time point (S605 in FIG. 6: true) at which a continuous time (or a continuous time included in the predetermined range including 0) in which the relative speed in the advancing direction is 0 has exceeded the first predetermined time. Therefore, the vehicle control device of the own vehicle 500 switches the travel control of the own vehicle 500 from the inter-vehicle distance control to the vehicle speed control (S606 in FIG. 6). Thus, even if the preceding vehicle 501 is accelerated after time point Δt12 and thus the inter-vehicle distance D1 between the own vehicle 500 and the preceding vehicle 501 becomes longer than the target inter-vehicle distance, the own vehicle 500 continues the vehicle speed control for keeping the vehicle speed constant. Instead of switching to the vehicle speed control, the acceleration may be made smaller than the current acceleration or the acceleration may be set to 0 [G]. Regarding the acceleration/deceleration command value in FIG. 7, a one-dot chain line after time point Δt12 indicates a value in a case where the inter-vehicle distance control is continued without performing switching from the inter-vehicle distance control to the vehicle speed control.

At time point Δt13 in FIG. 7, the adjacent vehicle 502 starts to cut in to the own vehicle lane 510B (that is, the adjacent vehicle 502 exceeds the white line threshold value 540) (S607 in FIG. 6: true), and the preceding vehicle is switched from the other vehicle 501 to the other vehicle 502 (S608 in FIG. 6). In this case, management may be performed by using a replacement flag or the like. After the preceding vehicle is replaced, the travel control is switched from the vehicle speed control to the inter-vehicle distance control (S609 in FIG. 6). Acceleration/deceleration of the own vehicle 500 is controlled such that the inter-vehicle distance D1 between the own vehicle 500 and the new preceding vehicle 502 coincides with the target inter-vehicle distance (or falls within the target inter-vehicle distance region).

Thus, after time point Δt13 in FIG. 7, the vehicle control device of the own vehicle 500 controls the acceleration (acceleration/deceleration command value) according to the inter-vehicle distance D1 (or relative speed) between the own vehicle 500 and the new preceding vehicle 502. In a case where the relative speed between the own vehicle 500 and the new preceding vehicle 502 in the advancing direction is 0 or near 0 (or within a predetermined range including 0) and the inter-vehicle distance D1 does not suddenly decrease or in a case where the sufficient inter-vehicle distance D1 can be secured (S610 in FIG. 6: true), the deceleration is restricted and thus the inter-vehicle distance D1 gradually approaches the target inter-vehicle distance (S611 in FIG. 6). Although not illustrated in FIG. 7, in a case where the relative speed is not near 0 (or not within a predetermined range including 0) and the inter-vehicle distance D1 is suddenly shortened or in a case where the sufficient inter-vehicle distance D1 cannot be secured (S610 in FIG. 6: false), the deceleration is enhanced to secure the inter-vehicle distance D1 (S612 in FIG. 6).

In a case where the inter-vehicle distance control is maintained in a situation in which the adjacent vehicle 502 cuts in at time point Δt13 after the preceding vehicle 501 is accelerated from time point Δt12, the own vehicle 500 is accelerated to follow the preceding vehicle 501 and then is decelerated. In this case, sudden acceleration and sudden deceleration as indicated by a one-dot chain line in the acceleration/deceleration command value in FIG. 7 occur. However, in a case where the present invention is applied, the inter-vehicle distance control is switched to the vehicle speed control at time point Δt12 at which the adjacent vehicle 502 does not start to cut in. Since the acceleration of the own vehicle 500 is corrected according to the vehicle speed control at the time points Δt12 to Δt13, even if the adjacent vehicle 502 cuts in, the above-described sudden acceleration and sudden deceleration (one-dot chain line) do not occur.

Figure 8:
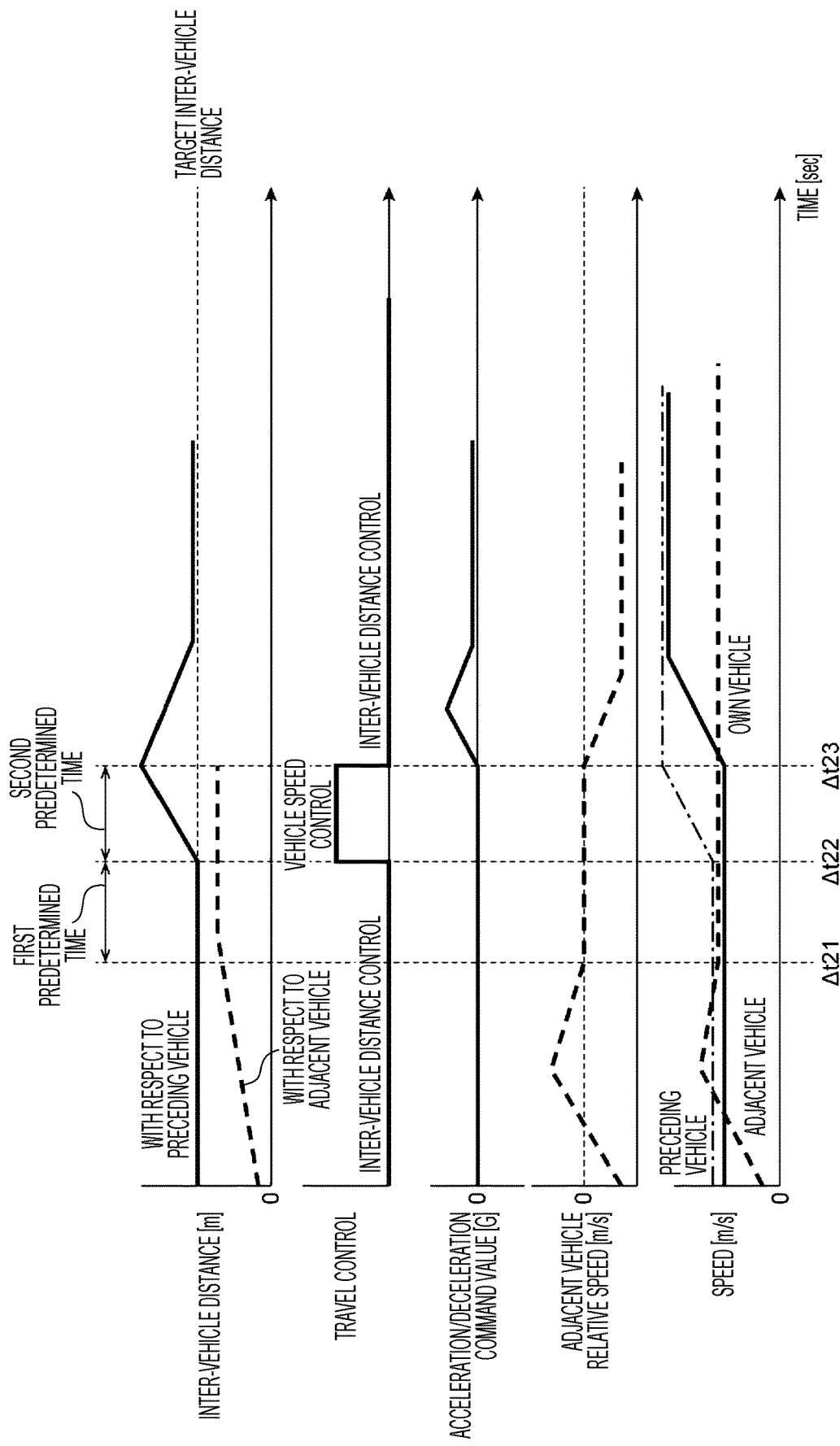
FIG. 8 is a second timing chart of execution of the cut-in possibility related control according to the embodiment of the present invention.
Figure 9:
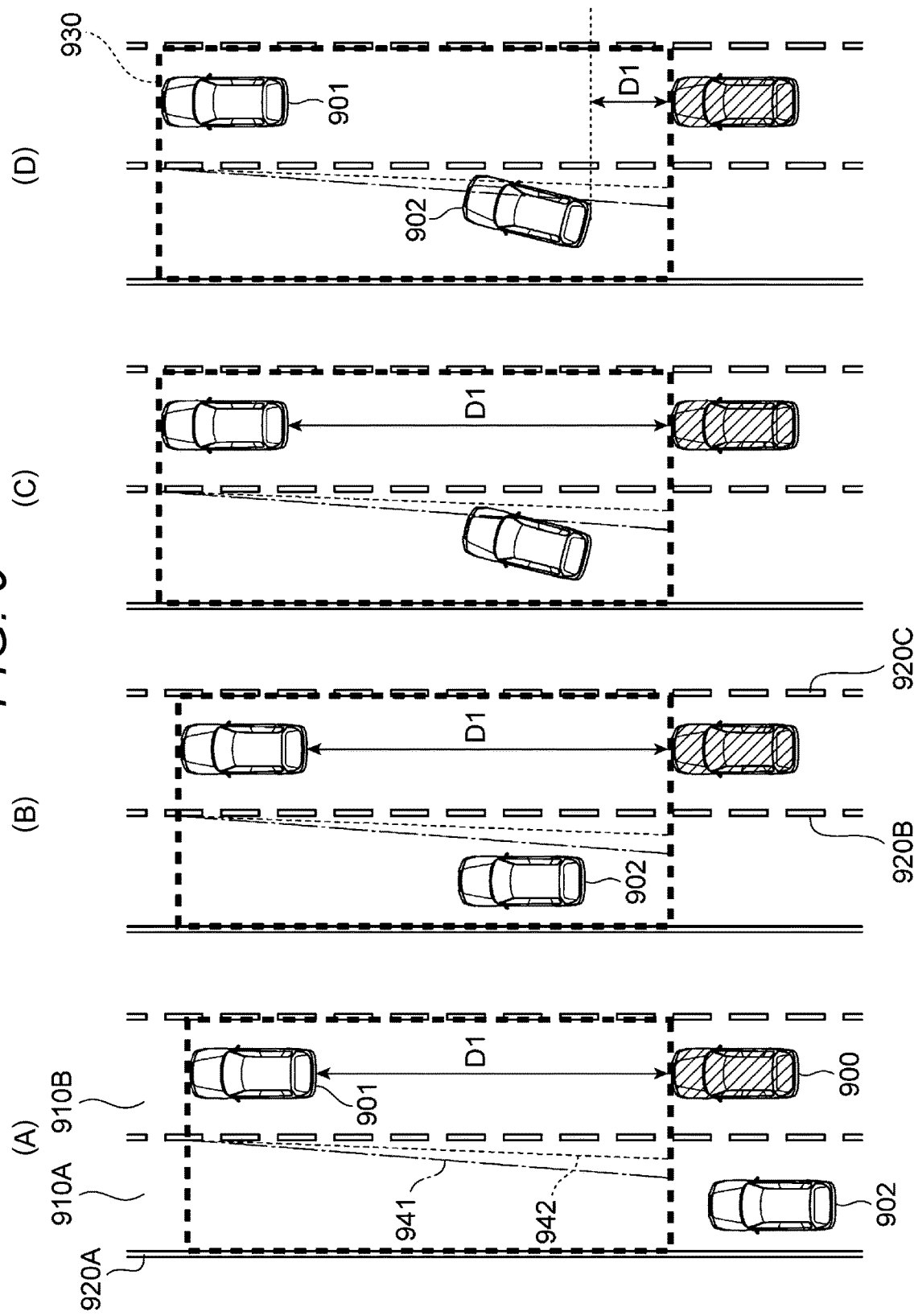
FIGS. 9(A) to 9(D) are explanatory diagrams illustrating first to fourth states of a first situation in which first cut-in related control according to the embodiment of the present invention is performed.

FIG. 8 is a second timing chart of execution of the cut-in possibility related control according to the embodiment of the present invention. Hereinafter, in the description of FIG. 8, the description will be made in association with FIGS. 5(A) to 5(D) and FIG. 6. In the example in FIG. 8, in ACC of the own vehicle 500, switching of the preceding vehicle from the other vehicle 501 to the other vehicle 502 does not occur.

Before time point Δt21 in FIG. 8, the inter-vehicle distance control with respect to the preceding vehicle 501 is performed (S601 in FIG. 6). At time point Δt21, the relative speed between the own vehicle 500 and the adjacent vehicle 502 in the advancing direction becomes 0 (or is included within a predetermined range including 0). Thereafter, a state in which the relative speed is zero (or a state included in a predetermined range including zero) continues.

Time point Δt22 is a time point (S605 in FIG. 6: true) at which a continuous time (or a continuous time included in the predetermined range including 0) in which the relative speed is 0 has exceeded the first predetermined time. Therefore, the vehicle control device of the own vehicle 500 switches the travel control of the own vehicle 500 from the inter-vehicle distance control to the vehicle speed control (S606 in FIG. 6). Therefore, even if the preceding vehicle 501 is accelerated after time point Δt22 and thus the inter-vehicle distance D1 between the own vehicle 500 and the preceding vehicle 501 becomes longer than the target inter-vehicle distance, the own vehicle 500 continues the vehicle speed control for keeping the vehicle speed constant. Instead of switching to the vehicle speed control, the acceleration may be made smaller than the current acceleration or the acceleration may be set to 0 [G].

At time point Δt23 in FIG. 8, after switching to the vehicle speed control (S606 in FIG. 6), the second predetermined time has elapsed in a state in which the adjacent vehicle 502 does not exceed the white line threshold value 540 (S613 in FIG. 6: true), and it is determined that there is no possibility of cut-in of the adjacent vehicle 502. The vehicle control device of the own vehicle 500 switches the travel control from the vehicle speed control to the inter-vehicle distance control (S614 in FIG. 6). In the new inter-vehicle distance control after time point Δt23, the preceding vehicle 501 is targeted in the same manner as in the inter-vehicle distance control up to time point Δt22. Therefore, the vehicle control device of the own vehicle 500 controls acceleration/deceleration of the own vehicle 500 such that the inter-vehicle distance D1 between the own vehicle 500 and the preceding vehicle 501 becomes the target inter-vehicle distance (or falls within the target inter-vehicle distance range).

As the second predetermined time, a specific fixed value may be used. Alternatively, the second predetermined time may be calculated by using a table or a map using at least one of the relative speed, the relative distance, or the relative acceleration between the own vehicle 500 and the adjacent vehicle 502 in the advancing direction, or the inter-vehicle distance D1 or the target inter-vehicle distance between the own vehicle 500 and the preceding vehicle 501 in the advancing direction.

In a case where the own vehicle 500 does not detect the preceding vehicle 501 after the lapse of the second predetermined time due to the acceleration of the preceding vehicle 501, the vehicle control device of the own vehicle 500 may execute vehicle speed control for controlling the acceleration of the own vehicle 500 such that the own vehicle travels at a preset target vehicle speed or a current vehicle speed.

(A-2-4. First Cut-In Related Control (Acceleration/Deceleration Control Based on Lateral Direction Position of Adjacent Vehicle))

Next, the first cut-in related control will be described with reference to FIGS. 9(A) to 13. As described above, the first cut-in related control is acceleration/deceleration control based on a lateral direction position of the adjacent vehicle.

FIGS. 9(A) to 9(D) are explanatory diagrams illustrating first to fourth states of a first situation in which the first cut-in related control according to the embodiment of the present invention is performed. In FIGS. 9(A) to 9(D), an own vehicle 900 and other vehicles 901 and 902 are traveling in the same direction. Roads in FIGS. 9(A) to 9(D) include lanes 910A and 910B. Hereinafter, the lane 910B in which the own vehicle 900 and the other vehicle 901 are traveling will also be referred to as an own vehicle lane 910B. The lane 910A adjacent to the own vehicle lane 910B will also be referred to as an adjacent lane 910A. The adjacent lane 910A is defined by white lines 920A and 920B, and the own vehicle lane 910B is defined by white lines 920B and 920C. The other vehicle 901 traveling immediately in front of the own vehicle 900 in the own vehicle lane 910B will also be referred to as a preceding vehicle 901, and the other vehicle 902 traveling in the adjacent lane 910A will also be referred to as an adjacent vehicle 902.

In FIGS. 9(A) to 9(D), the own vehicle 900 continues ACC. In FIG. 9(A), the own vehicle 900 follows the preceding vehicle 901 according to the inter-vehicle distance control. Specifically, the vehicle control device of the own vehicle 900 controls acceleration/deceleration of the own vehicle 900 such that the inter-vehicle distance D1 between the own vehicle 900 and the preceding vehicle 901 is maintained to be the target inter-vehicle distance. The other vehicle 902 traveling in the adjacent lane 910A approaches the own vehicle 900 from behind the own vehicle 900.

The vehicle control device of the own vehicle 900 sets a monitoring region 930. The monitoring region 930 is a detection region of an adjacent vehicle (for example, the adjacent vehicle 902) and a cut-in vehicle at the time of executing ACC. In the examples in FIGS. 9(A) to 9(D), a range (advancing direction range) of the monitoring region 930 in the advancing direction is set from the front end of the own vehicle 900 to the front end of the preceding vehicle 901. A range (lateral direction range) of the monitoring region 930 in the lateral direction is set between the outer white lines 920A and 920C of the adjacent lane 910A and the own vehicle lane 910B.

The advancing direction range and the lateral direction range of the monitoring region 930 are not restricted to the above. For example, the advancing direction range may be from the rear end of the own vehicle 900 to the front end of the preceding vehicle 901, or from the rear end of the own vehicle 901 to the rear end of the preceding vehicle 901. The rearmost position of the advancing direction range may be set to a position behind the rear end of the own vehicle 900. In this case, in a case where the current various sensors cannot detect a vehicle (another vehicle) behind the rear end of the own vehicle 900, a sensor may be added to detect the vehicle in the own vehicle lane 910B or the adjacent lane 910A behind the rear end of the own vehicle 900. The lateral direction range of the monitoring region 930 may be changed according to the number of adjacent lanes.

In a case where the white line 920B can be detected, the vehicle control device of the own vehicle 900 sets a first white line threshold value 941 and a second white line threshold value 942. The first white line threshold value 941 is a threshold value (virtual white line) for determining whether or not there is a possibility (or whether or not there is a high possibility) that the adjacent vehicle 902 will cut in to the own vehicle lane 510B. The second white line threshold value 942 is a threshold value (virtual white line) for determining whether or not the adjacent vehicle 902 has started to cut in to the own vehicle lane 910B.

The first white line threshold value 941 is inclined with respect to the white line 920B. That is, the first white line threshold value 941 has a greater lateral direction offset value with respect to the white line 920B as it becomes closer to the own vehicle 900 side, and has a smaller lateral direction offset value with respect to the white line 920B as it becomes closer to the preceding vehicle 901 side. In the examples in FIGS. 9(A) to 9(D), the lateral direction offset value with respect to the white line 920B at the front end of the preceding vehicle 901 is zero (however, need not to be zero). Alternatively, an advancing direction position where the lateral direction offset value with respect to the white line 920B becomes zero may be another place (for example, a position separated by a predetermined distance with respect to the front end or the rear end of the preceding vehicle 901). As the inclination or the lateral direction offset value of the first white line threshold value 941, a specific fixed value may be used. Alternatively, the inclination or the lateral direction offset value of the first white line threshold value 941 may be calculated by using a table or a map using at least one of the relative speed, the relative distance, or the relative acceleration between the own vehicle 900 and the adjacent vehicle 902 in the advancing direction, or the inter-vehicle distance D1 or the target inter-vehicle distance between the own vehicle 900 and the preceding vehicle 901 in the advancing direction.

The second white line threshold value 942 is inclined with respect to the white line 920B between the white line 920B and the first white line threshold value 941. That is, the second white line threshold value 942 has a greater lateral direction offset value with respect to the white line 920B as it becomes closer to the own vehicle 900 side, and has a smaller lateral direction offset value with respect to the white line 920B as it becomes closer to the preceding vehicle 901 side. In the examples in FIGS. 9(A) to 9(D), the lateral direction offset value with respect to the white line 920B at the front end of the preceding vehicle 901 is zero (however, need not to be zero). Alternatively, an advancing direction position where the lateral direction offset value with respect to the white line 920B becomes zero may be another place (for example, a position separated by a predetermined distance with respect to the front end or the rear end of the preceding vehicle 901). As the inclination or the lateral direction offset value of the second white line threshold value 942, a specific fixed value may be used. Alternatively, the inclination or the lateral direction offset value of the second white line threshold value 942 may be calculated by using a table or a map using at least one of the relative speed, the relative distance, or the relative acceleration between the own vehicle 500 and the adjacent vehicle 502 in the advancing direction, or the inter-vehicle distance D1 or the target inter-vehicle distance between the own vehicle 900 and the preceding vehicle 901 in the advancing direction.

In FIG. 9(B), the own vehicle 900 continues the inter-vehicle distance control with respect to the preceding vehicle 901. On the other hand, the other vehicle 902 passes the own vehicle 900 and enters the monitoring region 930. Thus, the vehicle control device of the own vehicle 900 determines a possibility of cut-in of the adjacent vehicle 902 by using the relative position or the relative distance between the adjacent vehicle 902 and the first white line threshold value 941 in the lateral direction.

In FIG. 9(C), the adjacent vehicle 902 is exceeding the first white line threshold value 941. Thus, it is considered that there is a possibility that the adjacent vehicle 902 changes the lane (cuts in) between the preceding vehicle 901 and the own vehicle 900. Therefore, the vehicle control device of the own vehicle 900 stops the inter-vehicle distance control with respect to the preceding vehicle 901 and shifts to the vehicle speed control. As a result, the own vehicle 900 travels at the target speed, and the inter-vehicle distance D1 between the own vehicle 900 and the preceding vehicle 901 may deviate from the target inter-vehicle distance.

As described above, in a case where the own vehicle 900 continues the inter-vehicle distance control with respect to the preceding vehicle 901, when the preceding vehicle 901 is accelerated and thus the inter-vehicle distance D1 becomes longer than the target inter-vehicle distance, the vehicle control device of the own vehicle 900 accelerates the own vehicle 900 such that the inter-vehicle distance D1 coincides with the target inter-vehicle distance. However, in a case where the inter-vehicle distance control with respect to the preceding vehicle 901 is stopped and a shift to the vehicle speed control is executed, the own vehicle 900 continues constant speed traveling even if the preceding vehicle 901 is accelerated. Consequently, it is possible to prepare for cut-in of the adjacent vehicle 902.

In FIG. 9(D), the adjacent vehicle 902 enters the own vehicle lane 910B beyond the second white line threshold value 942. In a case where the adjacent vehicle 902 exceeds the second white line threshold value 942, the vehicle control device of the own vehicle 900 determines that the adjacent vehicle 902 has started a lane change to the own vehicle lane 910B (cut-in between the own vehicle 900 and the preceding vehicle 901). In this case, the vehicle control device of the own vehicle 900 sets the adjacent vehicle 902 as a new preceding vehicle and starts inter-vehicle distance control with respect to the new preceding vehicle 902. That is, the vehicle control device of the own vehicle 900 controls acceleration/deceleration of the own vehicle 900 such that the inter-vehicle distance D1 between the own vehicle 900 and the new preceding vehicle 902 maintains the target inter-vehicle distance.

FIGS. 10(A) to 10(D) are explanatory diagrams illustrating first to fourth states of a second situation in which the first cut-in related control according to the embodiment of the present invention is performed. In FIGS. 10(A) to 10(D), the own vehicle 1000 and the other vehicles 1001 and 1002 are traveling in the same direction. Roads in FIGS. 10(A) to 10(D) include lanes 1010A and 1010B. Hereinafter, the lane 1010B in which the own vehicle 1000 and the other vehicle 1001 are traveling will also be referred to as an own vehicle lane 1010B. The lane 1010A adjacent to the own vehicle lane 1010B will also be referred to as an adjacent lane 1010A. The adjacent lane 1010A is defined by white lines 1020A and 1020B, and the own vehicle lane 1010B is defined by white lines 1020B and 1020C. The other vehicle 1001 traveling immediately in front of the own vehicle 1000 in the own vehicle lane 1010B will also be referred to as a preceding vehicle 1001, and the other vehicle 1002 traveling in the adjacent lane 1010A will also be referred to as an adjacent vehicle 1002.

In FIGS. 10(A) to 10(D), the own vehicle 1000 continues ACC. FIGS. 10(A) to 10(C) are similar to FIGS. 9(A) to 9(C). That is, in FIG. 10(A), the own vehicle 1000 follows the preceding vehicle 1001 according to the inter-vehicle distance control. The other vehicle 1002 traveling in the adjacent lane 1010A approaches the own vehicle 1000 from behind the own vehicle 1000. The vehicle control device of the own vehicle 1000 sets a monitoring region 1030, a first white line threshold value 1041, and a second white line threshold value 1042.

In FIG. 10(B), the own vehicle 1000 continues the inter-vehicle distance control with respect to the preceding vehicle 1001. On the other hand, the other vehicle 1002 passes the own vehicle 1000 and enters the monitoring region 1030. Thus, the vehicle control device of the own vehicle 1000 determines a possibility of cut-in of the adjacent vehicle 1002 by using the relative position or the relative distance between the adjacent vehicle 1002 and the first white line threshold value 1041 in the lateral direction.

In FIG. 10(C), the adjacent vehicle 1002 exceeds the first white line threshold value 1041. Therefore, it is considered that there is a possibility that the adjacent vehicle 1002 changes the lane (cuts in) between the preceding vehicle 1001 and the own vehicle 1000. Therefore, the vehicle control device of the own vehicle 1000 stops the inter-vehicle distance control with respect to the preceding vehicle 1001 and shifts to the vehicle speed control. As a result, the own vehicle 1000 travels at the target speed, and the inter-vehicle distance D1 between the own vehicle 1000 and the preceding vehicle 1001 may deviate from the target inter-vehicle distance.

In FIG. 10(D), the adjacent vehicle 1002 is away from the first white line threshold value 1041. Therefore, it is considered that there is no possibility (or low possibility) that the adjacent vehicle 1002 changes the lane (cuts in) between the preceding vehicle 1001 and the own vehicle 1000. Therefore, the vehicle control device of the own vehicle 1000 stops the vehicle speed control and restarts the inter-vehicle distance control with respect to the preceding vehicle 1001.

When the adjacent vehicle 1002 temporarily exceeds the first white line threshold value 1041 and then moves away from the first white line threshold value 1041, in a case where the own vehicle 1000 no longer detects the preceding vehicle 1001 due to the acceleration of the preceding vehicle 1001, the vehicle control device of the own vehicle 1000 may execute vehicle speed control for controlling the acceleration of the own vehicle 1000 such that the own vehicle travels at a preset target vehicle speed or a current vehicle speed.

Figure 10:
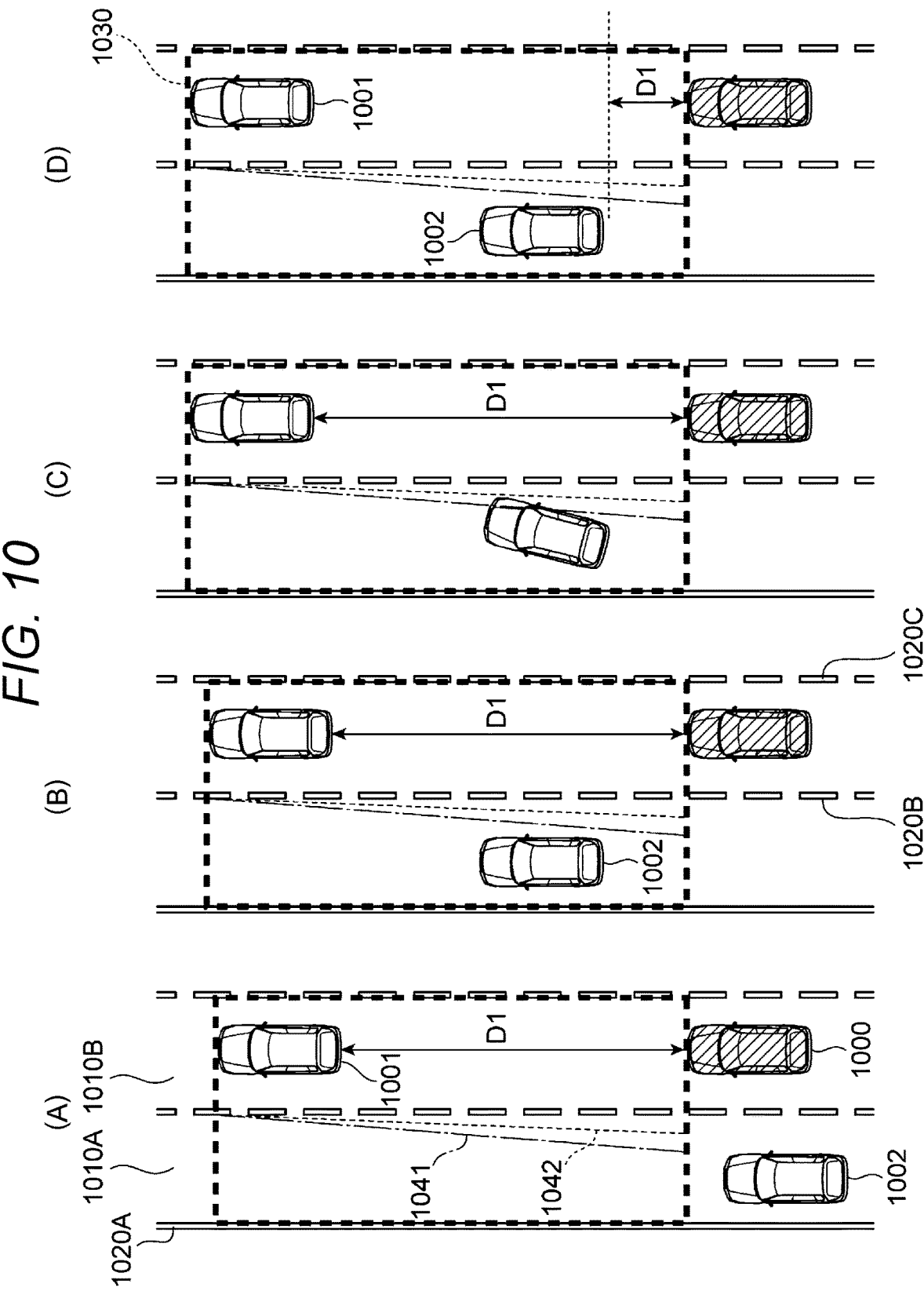
FIGS. 10(A) to 10(D) are explanatory diagrams illustrating first to fourth state of a second situation in which first cut-in related control according to the embodiment of the present invention is performed.
Figure 11:
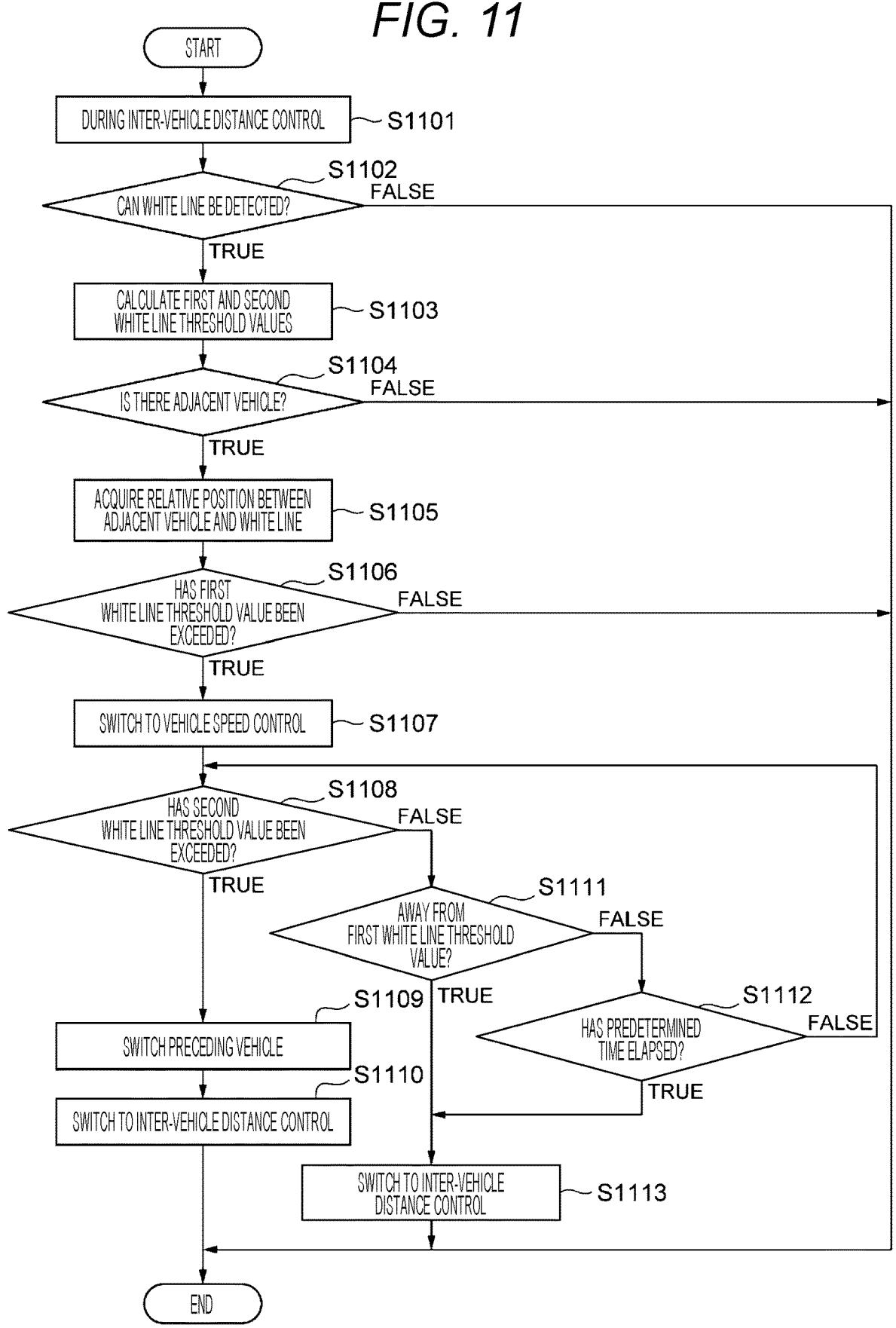
FIG. 11 is a flowchart illustrates the first cut-in related control according to the embodiment of the present invention.

FIG. 11 is a flowchart illustrating the first cut-in related control according to the embodiment of the present invention. Hereinafter, each step in FIG. 11 will be described in association with FIGS. 9(A) to 9(D) (or FIGS. 10(A) to 10(D)). In step S1101, the vehicle control device of the own vehicle 900 performs the inter-vehicle distance control of ACC (refer to FIG. 9(A)).

In step S1102, the vehicle control device of the own vehicle 900 determines whether or not the white line 920B can be detected. In a case where the white line 920B can be detected (S1102: true (TRUE)), the process proceeds to step S1103. In other cases (S1102: false (FALSE)), correction of the acceleration based on the cut-in determination of the present embodiment is ended. Note that, although not illustrated in FIG. 11, in a case where the white line cannot be detected (S1102: false), it is also possible to perform steps similar to steps S1106, S1108, and S1111 that will be described later on the basis of the lateral direction relative position, the relative speed, the relative distance, or the relative acceleration between the own vehicle 900 and the adjacent vehicle 902 instead of the white line 920B.

In step S1103, the vehicle control device of the own vehicle 900 calculates the first white line threshold value 941 and the second white line threshold value 942. As described above, the first white line threshold value 941 is a threshold value (virtual white line) for determining whether or not there is a possibility (or whether or not there is a high possibility) that the adjacent vehicle 902 will cut in to the own vehicle lane 910B. The second white line threshold value 942 is a threshold value (virtual white line) for determining whether or not the adjacent vehicle 902 has started to cut in to the own vehicle lane 910B. As described above, the first white line threshold value 941 can be inclined with respect to the white line 920B (or the lateral direction offset value with respect to the white line 920B can be changed). The second white line threshold value 942 can be inclined with respect to the white line 920B between the white line 920B and the first white line threshold value 941 (or the lateral direction offset value with respect to the white line 920B can be changed).

In step S1104, the vehicle control device of the own vehicle 900 determines whether or not the adjacent vehicle 902 is detected in the monitoring region 930. In a case where the adjacent vehicle 902 is detected (S1104: true), the process proceeds to step S1105. In other cases (S1104: false), the correction of the acceleration based on the cut-in determination of the present embodiment is ended. The monitoring region 930 is classified into an advancing direction range and a lateral direction range. As described above, the advancing direction range and the lateral direction range of the monitoring region 930 may be set as appropriate. Among the white lines 920A to 920C, a portion that cannot be imaged by the front imaging sensor 120 (FIG. 1) because it is too close to the own vehicle 900 (imaging impossible portion) may be detected or estimated on the basis of a continuous behavior of the own vehicle 900 or a comparison between past and current front images.

In step S1105, the vehicle control device of the own vehicle 900 acquires the relative position or the relative distance between the adjacent vehicle 902 and the white line 920B (and the first white line threshold value 941 and the second white line threshold value 942) in the lateral direction.

In step S1106, the vehicle control device of the own vehicle 900 determines whether the adjacent vehicle 902 has exceeded the first white line threshold value 941. In a case where the adjacent vehicle exceeds (S1106: true), the process proceeds to step S1107. In that case, a cut-in determination flag may be set to ON. In other cases (S1106: false), correction of the acceleration based on the cut-in determination of the present embodiment is ended.

In step S1107, the vehicle control device of the own vehicle 900 switches the travel control of the own vehicle 900 from the inter-vehicle distance control to the vehicle speed control. The target vehicle speed used in the vehicle speed control is set to a vehicle speed at the switching time or a vehicle speed lower than the vehicle speed at the switching time. Instead of switching to the vehicle speed control, the acceleration may be made smaller than the current acceleration or the acceleration may be set to 0 [G]. After step S1107, even if the preceding vehicle 901 is accelerated and thus the inter-vehicle distance D1 becomes longer than the target inter-vehicle distance, the own vehicle 900 continues the constant speed traveling. On the contrary, in a case where the preceding vehicle 901 is decelerated and thus the inter-vehicle distance D1 becomes shorter than the target inter-vehicle distance, the inter-vehicle distance control may be performed with priority over the vehicle speed control, and the own vehicle 900 may decelerate such that the inter-vehicle distance D1 from the preceding vehicle 901 becomes the target inter-vehicle distance. In other words, in step S1107, the vehicle speed control may be selected in a case where the inter-vehicle distance D1 from the preceding vehicle 901 is equal to or longer than the target inter-vehicle distance, and the inter-vehicle distance control may be selected in a case where the inter-vehicle distance D1 is shorter than the target inter-vehicle distance.

In step S1108, the vehicle control device of the own vehicle 900 determines whether the adjacent vehicle 902 has exceeded the second white line threshold value 942. In a case where the adjacent vehicle has exceeded the second white line threshold value (S1108: true), the process proceeds to step S1109. In that case (or after step S1109 or S1110), the cut-in determination flag may be set to OFF.

In step S1109, the vehicle control device of the own vehicle 900 switches the preceding vehicle (another vehicle immediately in front of the own vehicle 900 in the own vehicle lane 910B) from the other vehicle 901 to the other vehicle 902. That is, in a case where the adjacent vehicle 902 has exceeded the second white line threshold value 942, the own vehicle 900 recognizes the adjacent vehicle 902 as a cut-in vehicle or a new preceding vehicle instead of the preceding vehicle 901 that has been followed so far.

In step S1110, the vehicle control device of the own vehicle 900 switches the travel control of the own vehicle 900 from the vehicle speed control to the inter-vehicle distance control. At that time, the new preceding vehicle 902 (original adjacent vehicle) is a target of the inter-vehicle distance control. In a case where the adjacent vehicle 902 cuts in and becomes a new preceding vehicle 902, it is assumed that the inter-vehicle distance D1 between the own vehicle 900 and the new preceding vehicle 902 is shorter than the target inter-vehicle distance. After step S1110, processes similar to the processes in steps S610 to S612 in FIG. 6 may be performed.

In a case where the adjacent vehicle has not exceeded the second white line threshold value 942 (S1108: false), the process proceeds to step S1111. In step S1111, the vehicle control device of the own vehicle 900 determines whether the adjacent vehicle 902 has moved away from the first white line threshold value 941. In a case where the adjacent vehicle has moved away (step S1111: true), the process proceeds to step S1113. In other cases (step S1111: false), the process proceeds to step S1112. Note that, in order to provide hysteresis characteristics, in step S1111, instead of the first white line threshold value 941, a third white line threshold value closer to the adjacent lane 910A than the first white line threshold value 941 may be used.

In step S1112, the vehicle control device of the own vehicle 900 determines whether or not a third predetermined time has elapsed after true in step S1106. In a case where the time has elapsed (S1112: true), the adjacent vehicle 902 determines that there is no possibility (or low possibility) of cut-in, and the process proceeds to step S1113. In other cases (S1112: false), it is determined that there is a possibility (or high possibility) of cut-in of the adjacent vehicle 902, and the process returns to step S1108. As the third predetermined time (third time threshold value), a specific fixed value may be used. Alternatively, the third predetermined time may be calculated by using a table or a map using at least one of the relative speed, the relative distance, or the relative acceleration between the own vehicle 900 and the adjacent vehicle 902 in the advancing direction, or the inter-vehicle distance D1 or the target inter-vehicle distance between the own vehicle 500 and the preceding vehicle 501 in the advancing direction.

In step S1113, the vehicle control device of the own vehicle 900 switches the travel control of the own vehicle 900 from the vehicle speed control to the inter-vehicle distance control. At that time, the preceding vehicle 901 that is the same target of the previous inter-vehicle distance control is set as a target of the inter-vehicle distance control. In a case where the own vehicle 900 does not detect the preceding vehicle 901 after the lapse of the third predetermined time due to the acceleration of the preceding vehicle 901, the vehicle control device of the own vehicle 900 may execute vehicle speed control for controlling the acceleration of the own vehicle 900 such that the own vehicle travels at a preset target vehicle speed or a current vehicle speed.

Figure 12:
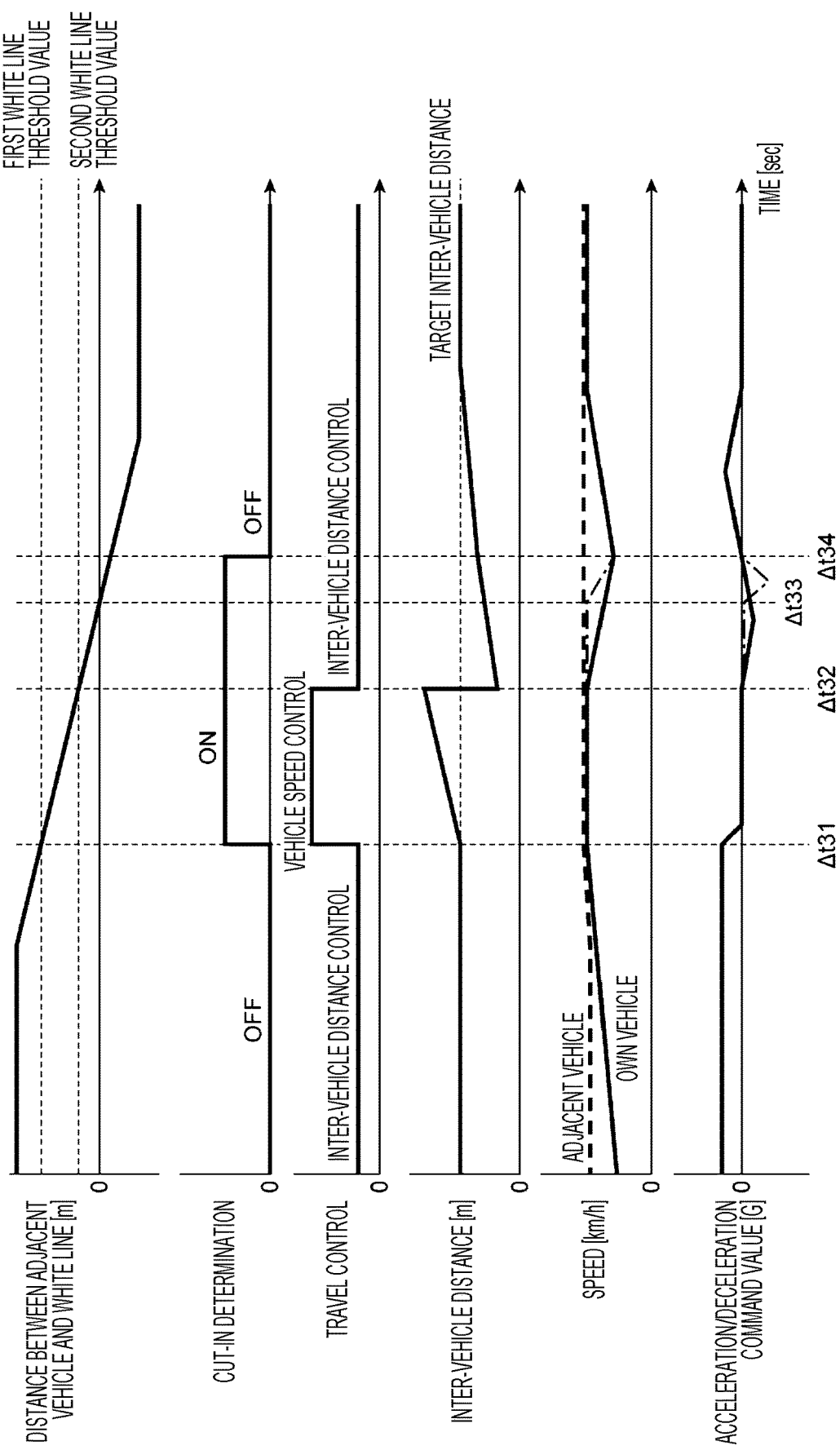
FIG. 12 is a first timing chart of execution of the first cut-in related control according to an embodiment of the present invention.

FIG. 12 is a first timing chart of execution of the first cut-in related control according to the embodiment of the present invention. Hereinafter, in the description of FIG. 12, the description will be made in association with FIGS. 9(A) to 9(D) and FIG. 11. In the example in FIG. 12, in ACC of the own vehicle 900, switching of the preceding vehicle from the other vehicle 901 to the other vehicle 902 occurs.

Before time point Δt31 in FIG. 12, the inter-vehicle distance control with respect to the preceding vehicle 901 is performed (S1101 in FIG. 11). At time point Δt31, the adjacent vehicle 902 exceeds the first white line threshold value 941 (step S1106 in FIGS. 9(C) and 11: true). Therefore, the vehicle control device of the own vehicle 900 sets the cut-in determination flag to ON and switches the travel control of the own vehicle 900 from the inter-vehicle distance control to the vehicle speed control (S1107 in FIG. 11). Thus, even if the preceding vehicle 901 is accelerated after time point Δt31 and thus the inter-vehicle distance D1 between the own vehicle 900 and the preceding vehicle 901 becomes longer than the target inter-vehicle distance, the own vehicle 900 continues the vehicle speed control for keeping the vehicle speed constant. Instead of switching to the vehicle speed control, the acceleration may be made smaller than the current acceleration or the acceleration may be set to 0 [G].

At time point Δt32 in FIG. 12, the adjacent vehicle 902 starts to cut in to the own vehicle lane 910B (that is, since the adjacent vehicle 902 has exceeded the second white line threshold value 942) (S1108 in FIG. 11: true), and the preceding vehicle is switched from the other vehicle 901 to the other vehicle 902 (S1109 in FIG. 11). In this case, management may be performed by using a replacement flag or the like. After the preceding vehicle is replaced, the travel control is switched from the vehicle speed control to the inter-vehicle distance control (S1110 in FIG. 11). Acceleration/deceleration of the own vehicle 900 is controlled such that the inter-vehicle distance D1 between the own vehicle 900 and the new preceding vehicle 902 coincides with the target inter-vehicle distance (or falls within the target inter-vehicle distance region).

At time point Δt33 in FIG. 12, the adjacent vehicle 902 exceeds the white line 920B (the lateral direction distance between the adjacent vehicle 902 and the white line 920B is zero or less). The one-dot chains line in the acceleration/deceleration command value and the vehicle speed in FIG. 12 relate to a comparative example. In the comparative example, the acceleration of the own vehicle 900 is corrected at time point Δt33 at which the adjacent vehicle 902 exceeds the white line 920B. Thus, sudden deceleration occurs in order to increase the suddenly shortened inter-vehicle distance D1. In contrast, in the embodiment according to the present invention, the travel control is switched to the inter-vehicle distance control in which the adjacent vehicle 902 becomes a new preceding vehicle 902 at time point Δt32, and the deceleration is started. Thus, the own vehicle 900 does not cause sudden deceleration, and the ride comfort of a driver is not impaired.

At time point Δt34 in FIG. 12, the acceleration command value for the own vehicle 900 becomes 0 or more. Accordingly, the vehicle control device of the own vehicle 900 sets the cut-in determination flag to OFF. A timing at which the cut-in determination flag is set to OFF may be, for example, time point Δt32 or Δt33.

Figure 13:
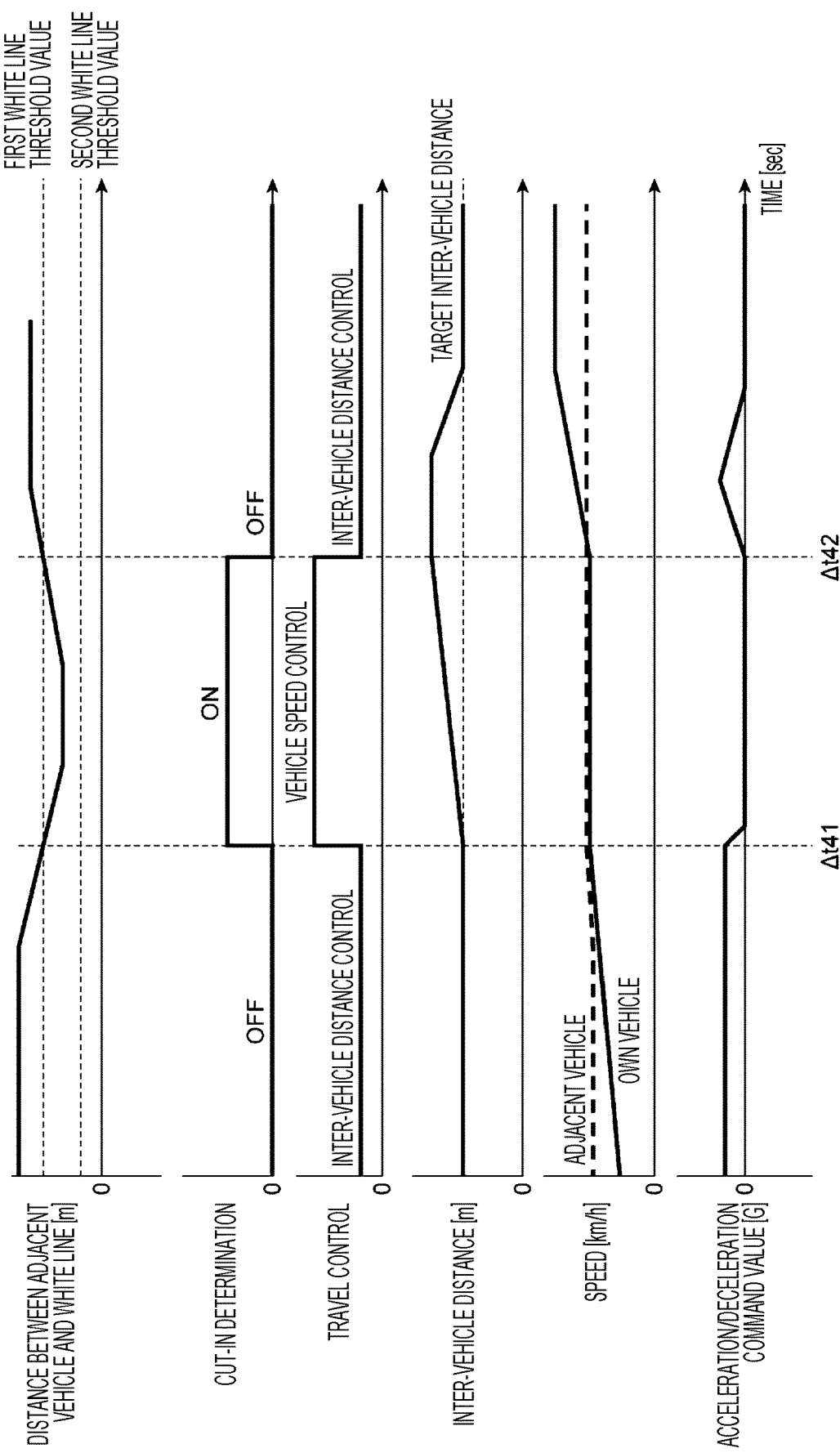
FIG. 13 is a second timing chart of execution of the first cut-in related control according to the embodiment of the present invention.

FIG. 13 is a second timing chart of execution of the first cut-in related control according to the embodiment of the present invention. Hereinafter, in the description of FIG. 12, the description will be made in association with FIGS. 10(A) to 10(D) and FIG. 11. In the example in FIG. 13, in ACC of the own vehicle 1000, switching of the preceding vehicle from the other vehicle 1001 to the other vehicle 1002 does not occur.

Before time point Δt41 in FIG. 13, the inter-vehicle distance control with respect to the preceding vehicle 1001 is performed (S1101 in FIG. 11). At time point Δt41, the adjacent vehicle 1002 exceeds the first white line threshold value 1041 (step S1106 in FIGS. 10(C) and 11: true). Therefore, the vehicle control device of the own vehicle 1000 sets the cut-in determination flag to ON and switches the travel control of the own vehicle 1000 from the inter-vehicle distance control to the vehicle speed control (S1107 in FIG. 11). Thus, even if the preceding vehicle 1001 is accelerated after time point Δt41 and thus the inter-vehicle distance D1 between the own vehicle 1000 and the preceding vehicle 1001 becomes longer than the target inter-vehicle distance, the own vehicle 1000 continues the vehicle speed control for keeping the vehicle speed constant. Instead of switching to the vehicle speed control, the acceleration may be made smaller than the current acceleration or the acceleration may be set to 0 [G].

At time point Δt42 in FIG. 13, the adjacent vehicle 1002 moves away from the first white line threshold value 1041 (S1111 in FIG. 11: true). In this case, the vehicle control device of the own vehicle 1000 switches the travel control of the own vehicle 1000 from the vehicle speed control to the inter-vehicle distance control (S1113 in FIG. 11). At that time, the preceding vehicle 1001 that is the same target of the previous inter-vehicle distance control is set as a target of the inter-vehicle distance control. The cut-in determination flag is set to OFF.

In a case where the travel control is switched to the inter-vehicle distance control at time point Δt42, the inter-vehicle distance D1 between the own vehicle 1000 and the preceding vehicle 1001 is longer than the target inter-vehicle distance. Therefore, the vehicle control device of the own vehicle 1000 increases the vehicle speed of the own vehicle 1000 by increasing the acceleration command value, and performs control such that the inter-vehicle distance D1 coincides with the target inter-vehicle distance (or falls within the target inter-vehicle distance range). In a case where the own vehicle 1000 no longer detect the preceding vehicle 1001 at time point Δt42 due to the acceleration of the preceding vehicle 1001, the vehicle control device of the own vehicle 1000 may execute vehicle speed control for controlling the acceleration of the own vehicle 1000 such that the own vehicle travels at a preset target vehicle speed or a current vehicle speed.

(A-2-5. Second Cut-In Related Control (Acceleration/Deceleration Control Based on Cut-In Request from Adjacent Vehicle))

Next, the second cut-in related control will be described with reference to FIG. 14. As described above, the second cut-in related control is acceleration/deceleration control based on a cut-in request from the adjacent vehicle.

Figure 14:
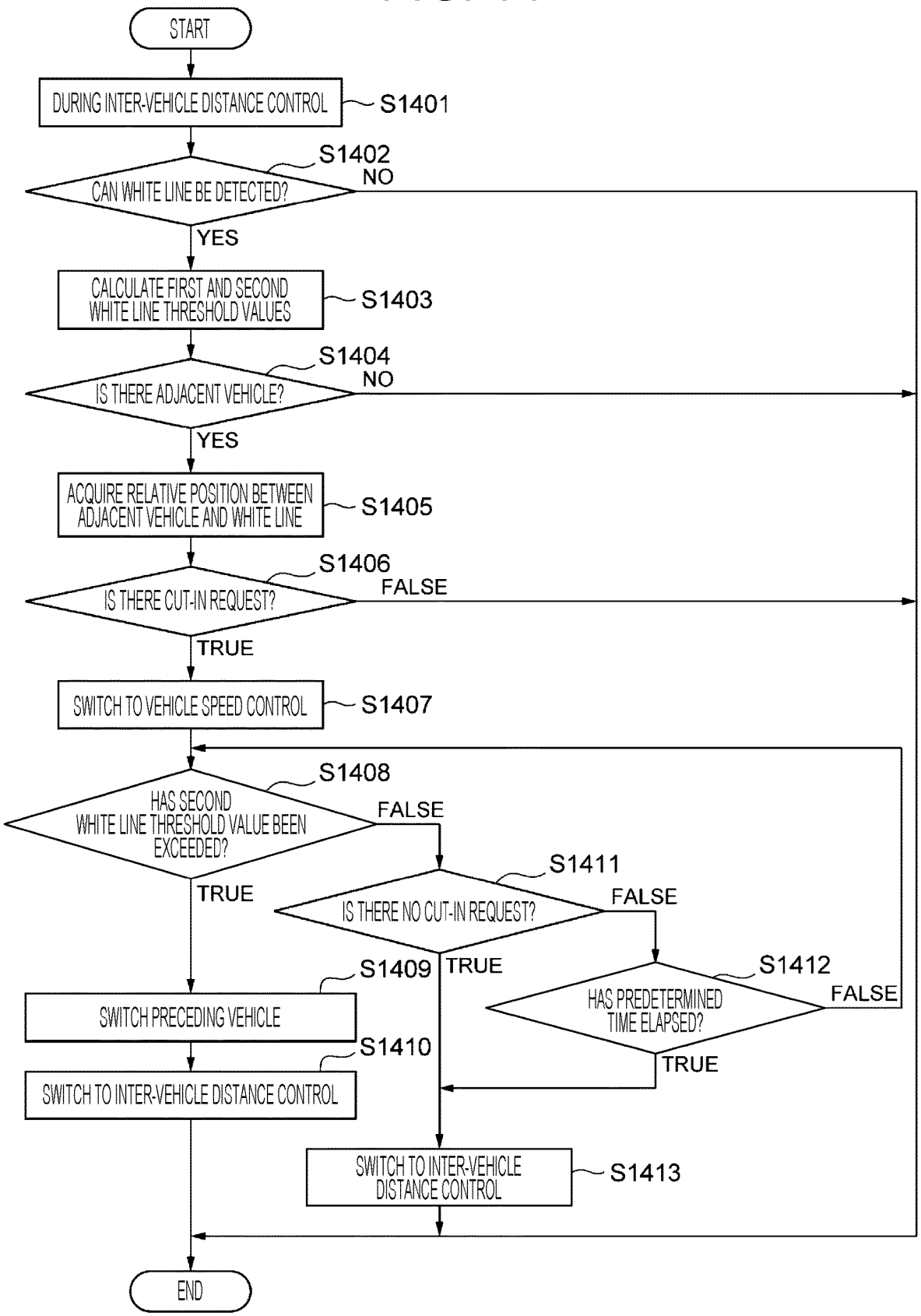
FIG. 14 is a flowchart of second cut-in related control according to the embodiment of the present invention.

FIG. 14 is a flowchart illustrating the second cut-in related control according to the embodiment of the present invention. Hereinafter, each step in FIG. 14 will be described in association with FIGS. 9(A) to 9(D). In step S1401, the vehicle control device of the own vehicle 900 performs the ACC inter-vehicle distance control (refer to FIG. 9(A)).

Steps S1401 to S1405 in FIG. 14 are similar to steps S1101 to S1105 in FIG. 11. However, the first white line threshold value 941 (FIG. 9(A)) is not used in the second cut-in related control (FIG. 14). Therefore, in step S1403, only the second white line threshold value 942 may be calculated.

In step S1406, the vehicle control device of the own vehicle 900 determines whether or not a cut-in request has been received from the adjacent vehicle 902. In a case where the cut-in request has been received (S1406: true), the process proceeds to step S1407. In other cases (S1406: false), correction of the acceleration based on the cut-in determination of the present embodiment is ended.

The cut-in request may include a form of a signal according to vehicle-to-vehicle communication between the own vehicle 900 and the adjacent vehicle 902, a signal in a case where the direction indicator of the adjacent vehicle 902 flashes toward the own vehicle lane 910B, or a signal according to road-to-vehicle communication in a merging section of an interchange or a construction section. In the present embodiment, the cut-in request is output from the adjacent vehicle 902 in a predetermined cycle until the cut-in is completed. Alternatively, in the case of a signal according to vehicle-to-vehicle communication or road-to-vehicle communication, the cut-in request may be transmitted only once, and then another signal indicating the progress of the cut-in (during cut-in, completion of cut-in, or the like) may be transmitted from the adjacent vehicle 902 to the own vehicle 900.

Steps S1407 to S1410 in FIG. 14 are similar to steps S1107 to S1110 in FIG. 11.

In step S1411, the vehicle control device of the own vehicle 900 determines whether or not a cut-in request has been received from the adjacent vehicle 902. As described above, in the present embodiment, the cut-in request is output from the adjacent vehicle 902 in a predetermined cycle until the cut-in is completed. Therefore, in a case where the cut-in request has not been received, the adjacent vehicle 902 can determine that the cut-in is stopped. Therefore, in a case where the cut-in request has not been received (S1411: true), the process proceeds to step S1413. In other cases (S1411: false), the process proceeds to step S1412. Note that, in a case where the cut-in request is transmitted only once and then another signal indicating the progress of the cut-in (during cut-in, completion of cut-in, or the like) is transmitted, it may be determined in step S1411 whether or not a signal indicating stop of the cut-in has been received.

Steps S1412 and S1413 are similar to steps S1112 and S1113 in FIG. 11.

(A-2-6. Further Description of Cut-In Possibility Related Control)

The cut-in possibility related control has been described above with reference to FIGS. 5(A) to 8. At that time, as a typical example, the case where a possibility of cut-in (or cut-in vehicle) is determined on the basis of the relative speed in the advancing direction before the adjacent vehicle 502 cuts in to the own vehicle lane 510B and the acceleration is corrected has been described. Hereinafter, the cut-in possibility related control will be described in more detail including other cases. In the following description, the description will be made in association with FIGS. 5(A) to 8.

Behaviors of the preceding vehicle 501 and the adjacent vehicle 502 in the advancing direction are classified into three types of acceleration, deceleration, and constant speed. Therefore, combinations of behaviors of the preceding vehicle 501 and the adjacent vehicle 502 in the advancing direction are classified into nine patterns. In a case where the own vehicle 500 performs inter-vehicle distance control with respect to the preceding vehicle 501, behaviors of the own vehicle 500 and the preceding vehicle 501 in the advancing direction are basically the same.

In the cut-in possibility determination control, it is determined whether or not the relative position between the own vehicle 500 and the adjacent vehicle 502 in the advancing direction is constant (for example, whether or not the relative speed between the own vehicle 500 and the adjacent vehicle 502 in the advancing direction is zero or near zero) (S605 in FIG. 6). Therefore, it is possible to classify into two patterns depending on whether the relative position between the own vehicle 500 and the adjacent vehicle 502 in the advancing direction is constant. For each of the nine patterns of combinations of behaviors of the preceding vehicle 501 and the adjacent vehicle 502 in the advancing direction, there are two patterns of cases where the relative position between the own vehicle 500 and the adjacent vehicle 502 in the advancing direction is constant and not, and thus the patterns can be classified into a total of 18 patterns (however, as will be described later, it is assumed that some patterns do not actually occur). Each of these 18 patterns will be described below.

Pattern 1: This is a case where the preceding vehicle 501 is accelerated, the adjacent vehicle 502 is accelerated, and the relative position between the own vehicle 500 and the adjacent vehicle 502 in the advancing direction is not constant (S605 in FIG. 6: false). In pattern 1, the own vehicle 500 maintains the inter-vehicle distance control with respect to the preceding vehicle 501 without performing switching from the inter-vehicle distance control to the vehicle speed control (S601 in FIG. 6). In this state, in a case where the preceding vehicle 501 is accelerated and thus the inter-vehicle distance D1 between the own vehicle 500 and the preceding vehicle 501 becomes longer than the target inter-vehicle distance, the own vehicle 500 corrects or increases the acceleration of the own vehicle such that the inter-vehicle distance D1 approaches the target inter-vehicle distance.

Pattern 2: This is a case where the preceding vehicle 501 is accelerated, the adjacent vehicle 502 is accelerated, and the relative position between the own vehicle 500 and the adjacent vehicle 502 in the advancing direction is constant (S605 in FIG. 6: true). In pattern 2, the own vehicle 500 performs switching from the inter-vehicle distance control to the vehicle speed control (S606 in FIG. 6). In this state, when the preceding vehicle 501 is accelerated, the inter-vehicle distance D1 between the own vehicle 500 and the preceding vehicle 501 increases. Therefore, the adjacent vehicle 502 easily cuts in between the preceding vehicle 501 and the own vehicle 500.

Pattern 3: This is a case where the preceding vehicle 501 is decelerated, the adjacent vehicle 502 is accelerated, and the relative position between the own vehicle 500 and the adjacent vehicle 502 in the advancing direction is not constant (S605 in FIG. 6: false). In pattern 3, the own vehicle 500 maintains the inter-vehicle distance control with respect to the preceding vehicle 501 without performing switching from the inter-vehicle distance control to the vehicle speed control (S601 in FIG. 6). In this state, in a case where the preceding vehicle 501 is decelerated and thus the inter-vehicle distance D1 between the own vehicle 500 and the preceding vehicle 501 becomes shorter than the target inter-vehicle distance, the own vehicle 500 corrects or decreases the acceleration of the own vehicle such that the inter-vehicle distance D1 approaches the target inter-vehicle distance.

Pattern 4: This is a case where the preceding vehicle 501 is decelerated, the adjacent vehicle is accelerated, and the relative position between the own vehicle 500 and the adjacent vehicle 502 in the advancing direction is constant (S605 in FIG. 6: true). However, in a case where the preceding vehicle 501 is decelerated, the own vehicle 501 is also decelerated. Therefore, actually, the relative position between the own vehicle 500 and the adjacent vehicle 502 in the advancing direction is not constant, and it is assumed that pattern 4 does not actually occur.

Pattern 5: This is a case where the preceding vehicle 501 is at a constant speed, the adjacent vehicle 502 is accelerated, and the relative position between the own vehicle 500 and the adjacent vehicle 502 in the advancing direction is not constant (S605 in FIG. 6: false). In pattern 5, the own vehicle 500 maintains the inter-vehicle distance control with respect to the preceding vehicle 501 without performing switching from the inter-vehicle distance control to the vehicle speed control (S601 in FIG. 6). In this state, the own vehicle 500 increases or decreases the acceleration of the own vehicle 500 such that the inter-vehicle distance D1 is maintained to be the target inter-vehicle distance.

Pattern 6: This is a case where the preceding vehicle 501 is at a constant speed, the adjacent vehicle 502 is accelerated, and the relative position between the own vehicle 500 and the adjacent vehicle 502 in the advancing direction is constant (S605 in FIG. 6: true). However, in a case where the preceding vehicle 501 is at a constant speed, since the own vehicle 501 is also at a constant speed, the relative position between the own vehicle 500 (constant speed) and the adjacent vehicle 502 (acceleration) in the advancing direction is not actually constant, and it is assumed that pattern 6 does not actually occur.

Pattern 7: This is a case where the preceding vehicle 501 is accelerated, the adjacent vehicle 502 is decelerated, and the relative position between the own vehicle 500 and the adjacent vehicle 502 in the advancing direction is not constant (S605 in FIG. 6: false). In pattern 7, the own vehicle 500 maintains the inter-vehicle distance control with respect to the preceding vehicle 501 without performing switching from the inter-vehicle distance control to the vehicle speed control (S601 in FIG. 6). In this state, the own vehicle 500 corrects or increases the acceleration of the own vehicle 500 such that the inter-vehicle distance D1 is maintained to be the target inter-vehicle distance.

Pattern 8: This is a case where the preceding vehicle 501 is accelerated, the adjacent vehicle 502 is decelerated, and the relative position between the own vehicle 500 and the adjacent vehicle 502 in the advancing direction is constant (S605 in FIG. 6: true). However, in a case where the preceding vehicle 501 is accelerated, the own vehicle 501 also is accelerated. Therefore, actually, the relative position between the own vehicle 500 (acceleration) and the adjacent vehicle 502 (deceleration) in the advancing direction is not constant, and it is assumed that pattern 8 does not actually occur.

Pattern 9: This is a case where the preceding vehicle 501 is decelerated, the adjacent vehicle 502 is decelerated, and the relative position between the own vehicle 500 and the adjacent vehicle 502 in the advancing direction is not constant (S605 in FIG. 6: false). In pattern 9, the own vehicle 500 does not perform switching from the inter-vehicle distance control to the vehicle speed control, and maintains the inter-vehicle distance control with respect to the preceding vehicle 501 (S601 in FIG. 6). In this state, the own vehicle 500 decreases the acceleration of the own vehicle 500 such that the inter-vehicle distance D1 is maintained to be the target inter-vehicle distance.

Pattern 10: This is a case where the preceding vehicle 501 is decelerated, the adjacent vehicle 502 is decelerated, and the relative position between the own vehicle 500 and the adjacent vehicle 502 in the advancing direction is constant (S605 in FIG. 6: true). In pattern 10, since the preceding vehicle 501 is decelerated, the own vehicle 500 maintains the inter-vehicle distance control without performing switching from the inter-vehicle distance control to the vehicle speed control as described above. The own vehicle 500 is decelerated in accordance with the preceding vehicle 501 such that the inter-vehicle distance D1 between the own vehicle 500 and the preceding vehicle 501 becomes the target inter-vehicle distance.

Pattern 11: This is a case where the preceding vehicle 501 is at a constant speed, the adjacent vehicle 502 is decelerated, and the relative position between the own vehicle 500 and the adjacent vehicle 502 in the advancing direction is not constant (S605 in FIG. 6: false). In pattern 11, the own vehicle 500 does not perform switching from the inter-vehicle distance control to the vehicle speed control, and maintains the inter-vehicle distance control with respect to the preceding vehicle 501 (S601 in FIG. 6). In this state, the own vehicle 500 maintains or increases or decreases the acceleration of the own vehicle 500 such that the inter-vehicle distance D1 is maintained to be the target inter-vehicle distance.

Pattern 12: This is a case where the preceding vehicle 501 is at a constant speed, the adjacent vehicle 502 is decelerated, relative position between the own vehicle 500 and the adjacent vehicle 502 in the advancing direction is constant (S605 in FIG. 6: true). However, in a case where the preceding vehicle 501 is at a constant speed, since the own vehicle 501 is also at a constant speed, the relative position between the own vehicle 500 (constant speed) and the adjacent vehicle 502 (deceleration) in the advancing direction is not actually constant, and it is assumed that pattern 12 does not actually occur.

Pattern 13: This is a case where the preceding vehicle 501 is accelerated, the adjacent vehicle 502 travels at a constant speed, and the relative position between the own vehicle 500 and the adjacent vehicle 502 in the advancing direction is not constant (S605 in FIG. 6: false). In pattern 13, the own vehicle 500 does not perform switching from the inter-vehicle distance control to the vehicle speed control, and maintains the inter-vehicle distance control with respect to the preceding vehicle 501 (S601 in FIG. 6). In this state, the own vehicle 500 corrects or increases the acceleration of the own vehicle 500 such that the inter-vehicle distance D1 is maintained to be the target inter-vehicle distance.

Pattern 14: This is a case where the preceding vehicle 501 is accelerated, the adjacent vehicle 502 travels at a constant speed, and the relative position between the own vehicle 500 and the adjacent vehicle 502 in the advancing direction is constant (S605 in FIG. 6: true). However, in a case where the preceding vehicle 501 is accelerated, the own vehicle 501 is also accelerated. Therefore, actually, the relative position between the own vehicle 500 (acceleration) and the adjacent vehicle 502 (constant speed) in the advancing direction is not constant, and it is assumed that pattern 14 does not actually occur.

Pattern 15: This is a case where the preceding vehicle 501 is decelerated, the adjacent vehicle 502 travels at a constant speed, and the relative position between the own vehicle 500 and the adjacent vehicle 502 in the advancing direction is not constant (S605 in FIG. 6: false). In pattern 15, the own vehicle 500 does not perform switching from the inter-vehicle distance control to the vehicle speed control, and maintains the inter-vehicle distance control with respect to the preceding vehicle 501 (S601 in FIG. 6). In this state, the own vehicle 500 corrects or decreases the acceleration of the own vehicle 500 such that the inter-vehicle distance D1 is maintained to be the target inter-vehicle distance.

Pattern 16: This is a case where the preceding vehicle 501 is decelerated, the adjacent vehicle 502 travels at a constant speed, and the relative position between the own vehicle 500 and the adjacent vehicle 502 in the advancing direction is constant (S605 in FIG. 6: true). However, in a case where the preceding vehicle 501 is decelerated, the own vehicle 501 is also decelerated. Therefore, actually, the relative position between the own vehicle 500 (deceleration) and the adjacent vehicle 502 (constant speed) in the advancing direction is not constant, and it is assumed that pattern 16 does not actually occur.

Pattern 17: This is a case where the preceding vehicle 501 travels at a constant speed, the adjacent vehicle 502 travels at a constant speed, and the relative position between the own vehicle 500 and the adjacent vehicle 502 in the advancing direction is not constant (S605: false in FIG. 6). In pattern 17, the own vehicle 500 does not perform switching from the inter-vehicle distance control to the vehicle speed control, and maintains the inter-vehicle distance control with respect to the preceding vehicle 501 (S601 in FIG. 6). In this state, the own vehicle 500 maintains or increases or decreases the acceleration of the own vehicle 500 such that the inter-vehicle distance D1 is maintained to be the target inter-vehicle distance.

Pattern 18: This is a case where the preceding vehicle 501 travels at a constant speed, the adjacent vehicle 502 travels at a constant speed, and the relative position between the own vehicle 500 and the adjacent vehicle 502 in the advancing direction is constant (S605 in FIG.

6: true). In pattern 18, the own vehicle 500 performs switching from the inter-vehicle distance control to the vehicle speed control (S606 in FIG. 6). In this state, the inter-vehicle distance D1 is increased by reducing the vehicle speed of the own vehicle 500 to be lower than that of the preceding vehicle 501. Therefore, the adjacent vehicle 502 easily cuts in between the preceding vehicle 501 and the own vehicle 500.

[A-3. Operations and Effects of Various Embodiments of Present Invention]

In the embodiment in FIGS. 5(A) to 8, the target acceleration calculation unit 206 (acceleration/deceleration control unit) switches the inter-vehicle distance control to the vehicle speed control on the basis of a possibility of cut-in that is determined on the basis of the relative speed (adjacent vehicle relationship value) between the own vehicle 500 and the adjacent vehicle 502 in the advancing direction (S606 in FIG. 6). In other words, the target acceleration calculation unit 206 corrects the acceleration/deceleration of the own vehicle 500 on the basis of the possibility of the cut-in.

According to the embodiment, not only in a case where the adjacent vehicle 502 actually starts to cut in (change the lane) to the own vehicle lane 510B through movement in the lateral direction (lane width direction) and is set as a new preceding vehicle, but also in a case where the adjacent vehicle 502 is traveling straight in the adjacent lane 510A, the acceleration/deceleration of the own vehicle 500 is controlled according to a possibility of cut-in of the adjacent vehicle 502. As a result, it is possible to control acceleration/deceleration of the own vehicle 500 according to a possibility of cut-in.

In particular, in the case of the present embodiment, instead of or in addition to a behavior of the adjacent vehicle 502 in the lateral direction (lane width direction), a possibility of cut-in is determined on the basis of the relative speed between the adjacent vehicle 502 and the own vehicle 500 in the advancing direction. Therefore, it is possible to determine a possibility of cut-in at an earlier stage and thus to smoothly perform acceleration/deceleration of the own vehicle 500.

For example, a case where the adjacent vehicle 502 cuts in between the preceding vehicle 501 and the own vehicle 500 during acceleration of the preceding vehicle 501 in a state in which the own vehicle 500 performs inter-vehicle distance control to keep the inter-vehicle distance D1 with the preceding vehicle 501 constant is considered (FIG. 5(C)). For example, in a case where it is detected that the adjacent vehicle 502 cuts in (changes the lane) to the own vehicle lane 510B from the adjacent lane 510A only through lateral movement of the adjacent vehicle 502, the own vehicle 500 is also accelerated along with the acceleration of the preceding vehicle 501 until the start of cut-in (lane change) of the adjacent vehicle 502 is detected. The own vehicle 500 is decelerated at the time at which the start of the cut-in (lane change) of the adjacent vehicle 502 is detected. If the vehicle is decelerated immediately after acceleration as described above, smooth acceleration/deceleration cannot be performed, and the ride comfort of a driver or the like may deteriorate.

In the above embodiment, even before the adjacent vehicle 502 starts movement in the lateral direction in order to perform cut-in (lane change), the acceleration/deceleration of the own vehicle 500 is controlled by using a possibility of the cut-in determined on the basis of the relative speed between the adjacent vehicle 502 and the own vehicle 500 in the advancing direction. For example, even when the preceding vehicle 501 is being accelerated, if it is determined that there is a possibility or a high possibility of cut-in of the adjacent vehicle 502 before the lateral movement of the adjacent vehicle 502, the own vehicle 500 can travel at a constant speed or be decelerated without being accelerated. As a result, smooth acceleration and deceleration can be performed, and ride comfort can be improved.

In the embodiment in FIGS. 5(A) to 8, when the adjacent vehicle 502 is within the monitoring region 530 (in other words, in a cut-in possible position) and the relative speed between the own vehicle 500 and the adjacent vehicle 502 has exceeded the first predetermined time (first time threshold value) (S605 in FIG. 6: true), the target acceleration calculation unit 206 (acceleration/deceleration control unit) switches the inter-vehicle distance control to the vehicle speed control (S606 in FIG. 6). In other words, the target acceleration calculation unit 206 corrects the acceleration/deceleration of the own vehicle 500 when the first predetermined time has elapsed. As a result, it is possible to easily determine a possibility of cut-in of the adjacent vehicle 502 on the basis of the relative speed between the adjacent vehicle 502 and the own vehicle 500 in the advancing direction. Since the acceleration/deceleration of the own vehicle 500 is corrected when the time indicating the state in which the relative position is constant exceeds the first predetermined time, it is possible to perform correction at a more appropriate timing.

In the embodiment in FIGS. 5(A) to 8, in a case where the inter-vehicle distance control for controlling acceleration/deceleration of the own vehicle 500 such that the inter-vehicle distance D1 from the preceding vehicle 501 is maintained within a certain range is being performed, when a continuous time for which the relative position (adjacent vehicle relationship value) between the own vehicle 500 and the adjacent vehicle 502 indicates that the adjacent vehicle 502 is in the monitoring region 530 (in other words, in a position where the adjacent vehicle can cut in immediately in front of the own vehicle 500) exceeds the first predetermined time (first time threshold value), the target acceleration calculation unit 206 (acceleration/deceleration control unit) performs switching to the vehicle speed control for controlling acceleration/deceleration of the own vehicle 500 such that the speed of the own vehicle 500 becomes the target vehicle speed (S606 in FIG. 6). Consequently, it is easy to prepare for cut-in of the adjacent vehicle 502.

In the embodiment in FIGS. 5(A) to 8, the lane change detection unit 205 (lane change detection unit) detects the cut-in of the adjacent vehicle 502 on the basis of the lateral direction relative position between the white line 520B between the adjacent lane 510A and the own vehicle lane 510B and the adjacent vehicle 502 (S607 in FIG. 6). Consequently, it is possible to easily determine the start of cut-in (lane change) of the adjacent vehicle 502.

In the embodiment in FIGS. 5(A) to 8, the lane change detection unit 205 (lane change detection unit) sets the monitoring region 530 for monitoring a possibility of cut-in (FIGS. 5(A) to 5(D)). A range of the monitoring region 530 in the advancing direction is set between the preceding vehicle 501 and the own vehicle 500. As a result, it is possible to suppress a calculation load by determining a possibility of cut-in only for the adjacent vehicle 502 having a relatively high possibility of the cut-in.

In the embodiment in FIGS. 5(A) to 8, after the inter-vehicle distance control (correction of acceleration/deceleration of the own vehicle 500) is started on the basis of the relative speed in the advancing direction (S606 after S605 in FIG. 6: true), when a continuous time for which the relative speed in the advancing direction indicates that the adjacent vehicle 502 is in a cut-in possible position immediately in front of the own vehicle 500 exceeds the second predetermined time (second time threshold value) (S613: true), the target acceleration calculation unit 206 (acceleration/deceleration control unit) cancels the vehicle speed control (correction of acceleration/deceleration of the own vehicle 500) and returns to the inter-vehicle distance control (S614). As a result, even in a case where it is determined that a possibility of cut-in of the adjacent vehicle 502 is high on the basis of the relative speed in the advancing direction and the correction of the acceleration/deceleration of the own vehicle 500 is started, when the adjacent vehicle 502 does not actually perform the cut-in, the vehicle speed control based on the relative speed in the advancing direction can be canceled. Therefore, the acceleration/deceleration of the own vehicle 500 can be controlled by more appropriately reflecting a status of the adjacent vehicle 502.

In the embodiment in FIGS. 5(A) to 8, in a case where it is determined whether or not the relative position between the own vehicle 500 and the adjacent vehicle 502 in the advancing direction is constant (S605 in FIG. 6), two or more indexes among the relative speed, the relative position, or the relative distance between the adjacent vehicle 502 and the own vehicle 500 in the advancing direction may be used. Even in a case where there is the adjacent vehicle 502 in the monitoring region 530 (the adjacent vehicle 502 is in a cut-in possible position) and one of the indices indicates a state in which the relative position in the advancing direction is constant, in a case where another value indicates a state in which the relative position in the advancing direction is not constant, the target acceleration calculation unit 206 (acceleration/deceleration control unit) may restrict switching to the vehicle speed control (correction of acceleration/deceleration of the own vehicle 500 based on the adjacent vehicle relationship value). As a result, it is possible to more appropriately correct acceleration/deceleration of the own vehicle 500.

In the embodiment in FIGS. 5(A) to 8, in a case where the preceding vehicle 501 is being decelerated even if the relative position between the adjacent vehicle 502 and the own vehicle 500 in the advancing direction is constant (S605 in FIG. 6: true), the target acceleration calculation unit 206 (acceleration/deceleration control unit) may restrict switching to the vehicle speed control based on the relative speed between the adjacent vehicle 502 and the own vehicle 500 in the advancing direction (correction of the acceleration/deceleration of the own vehicle 500). As a result, it is possible to more appropriately correct acceleration/deceleration of the own vehicle 500.

In the embodiment in FIGS. 5(A) to 8, when the lane change detection unit 205 (lane change detection unit) detects cut-in (lane change) of the adjacent vehicle 502 to the own vehicle lane 510B and the adjacent vehicle 502 is set as a new preceding vehicle (FIGS. 5(D), and S608 after S607 in FIG. 6: true), the target acceleration calculation unit 206 (acceleration/deceleration control unit) executes the inter-vehicle distance control for controlling acceleration/deceleration of the own vehicle 500 such that the inter-vehicle distance D1 between the new preceding vehicle 502 and the own vehicle 500 is maintained within a certain range (S609 in FIG. 6). Consequently, in a case where a new preceding vehicle 502 occurs, automated driving can be appropriately continued. The same applies to the embodiment in FIGS. 9(A) to 14.

In the embodiment in FIGS. 5(A) to 8, the target acceleration calculation unit 206 (acceleration/deceleration control unit) increases the inter-vehicle distance D1 at a first deceleration (S611) in a case where the relative speed between the new preceding vehicle 502 and the own vehicle 500 in the advancing direction is within a first speed range including zero (S610 in FIG. 6: true) in the inter-vehicle distance control with respect to the new preceding vehicle 502 (S609 in FIG. 6). In a case where the relative speed between the new preceding vehicle 502 and the own vehicle 500 is not within the first speed range (S610: false), the inter-vehicle distance D1 is increased at a second deceleration having a larger absolute value than the first deceleration (S612). As a result, the inter-vehicle distance control can be started according to the relative speed between the new preceding vehicle 502 (original adjacent vehicle) and the own vehicle 500.

In the embodiment in FIG. 2, the vehicle control device 200 includes the imaging sensor 230 (imaging unit) that acquires a front image of the own vehicle, and the external recognition information conversion unit 202 (white line detection unit) that detects a white line between an adjacent lane and an own vehicle lane on the basis of the front image. The external recognition information conversion unit 202 detects a white line in the vicinity of the own vehicle that cannot be imaged by the imaging sensor 230 on the basis of a continuous behavior of the own vehicle or a comparison between past and current front image. As a result, it is possible to detect a white line portion in the vicinity of the own vehicle that cannot be imaged by the imaging sensor 230.

In the embodiment in FIGS. 9(A) to 13, the lane change detection unit 205 (lane change detection unit) determines a possibility of cut-in of the adjacent vehicle 902 on the basis of the lateral direction relative position between the first white line threshold value 941 and the adjacent vehicle 902 (in other words, the lateral direction relative position between the white line 920B between the adjacent lane 910A and the own vehicle lane 910B and the adjacent vehicle 902) (S1106 in FIG. 11). As a result, for example, even in a case where it is difficult to determine a possibility of cut-in on the basis of the relative speed or the like between the adjacent vehicle 902 and the own vehicle 900 in the advancing direction (for example, a case where the adjacent vehicle 902 starts to cut in before the relative position in the advancing direction between the adjacent vehicle 902 and the own vehicle 900 is constant for the first predetermined time), it is possible to determine a possibility of cut-in of the adjacent vehicle 902.

In the embodiment in FIGS. 9(A) to 13, the lane change detection unit 205 (lane change detection unit) sets the first white line threshold value 941 (first distance threshold value) related to a lateral direction relative distance between the white line 920B between the adjacent lane 910A and the own vehicle lane 910B and the adjacent vehicle 902 (FIGS. 9(A) to 9(D), and S1103 in FIG. 11). When the adjacent vehicle 902 exceeds the first white line threshold value 941 (FIGS. 9(C) and S1106 in FIG. 11: true), the lane change detection unit 205 determines that there is a possibility of cut-in of the adjacent vehicle 902 and performs switching to vehicle speed control (corrects the acceleration/deceleration of the own vehicle 900) (S1107 in FIG. 11).

The lane change detection unit 205 sets the second white line threshold value 942 (second distance threshold value) smaller than the first white line threshold value 941 with respect to the lateral direction relative distance between the white line 920B and the adjacent vehicle 902 (FIGS. 9(A) to 9(D), and S1103 in FIG. 11). When the adjacent vehicle 902 exceeds the second white line threshold value 942 (FIGS. 9(D), and S1108 in FIG. 11: true), the lane change detection unit 205 determines that the adjacent vehicle 902 has started to cut in to the own vehicle lane 910B and sets the adjacent vehicle 902 as a new preceding vehicle (S1109 in FIG. 11). Consequently, it is possible to smoothly switch a preceding vehicle in accordance with the cut-in.

In the embodiment in FIGS. 9(A) to 13, when the adjacent vehicle 902 moves away from the first white line threshold value 941 (FIGS. 10(D) and S1111 in FIG. 11: true) after exceeding the first white line threshold value 941 (first distance threshold value) and before exceeding the second white line threshold value 942 (second distance threshold value), the lane change detection unit 205 (lane change detection unit) cancels the vehicle speed control (correction of acceleration/deceleration of the own vehicle 900 based on the adjacent vehicle relationship value) as a result of the first white line threshold value 941 being exceeded, and returns to the inter-vehicle distance control (S1113 in FIG. 11).

Consequently, even in a case where it is determined that a possibility of cut-in of the adjacent vehicle 902 is high on the basis of the lateral direction relative distance between the white line 920B and the adjacent vehicle 902 and the vehicle speed control (correction of acceleration/deceleration of the own vehicle 900) is started, when the adjacent vehicle 902 does not actually perform cut-in, the vehicle speed control based on the lateral direction relative distance can be canceled. Therefore, the acceleration/deceleration of the own vehicle 900 can be controlled by more appropriately reflecting a status of the adjacent vehicle 902.

In the embodiment in FIG. 14, in a case where the direction indicator of the adjacent vehicle 902 indicates a lane change to the own vehicle lane 910B (S1406 in FIG. 14: true), the target acceleration calculation unit 206 (acceleration/deceleration control unit) performs switching to the vehicle speed control (correction of acceleration/deceleration of the own vehicle 900) (S1407 in FIG. 14). Consequently, it is possible to prepare for the start of cut-in of the adjacent vehicle 902.

In the embodiment in FIG. 14, in a case where a cut-in request is received from the adjacent vehicle through inter-vehicle communication (S1406: true in FIG. 14), the target acceleration calculation unit 206 (acceleration/deceleration control unit) performs switching to the vehicle speed control (correction of acceleration/deceleration of the own vehicle) (S1407 in FIG. 14). Consequently, it is possible to prepare for the start of cut-in of the adjacent vehicle.

B. Modification Examples

In the embodiment in FIGS. 5(A) to 5(D), the monitoring region 530 is disposed in front of the own vehicle 500. However, a range of the monitoring region 530 is not limited thereto. For example, a range of the monitoring region 530 may also include the lateral sides of the own vehicle 500. In a case where the lateral side of the own vehicle 500 cannot be detected by the above-described sensors, another sensor such as an imaging sensor, a laser radar, or a LiDAR may be added to expand the monitoring region 530. As a result, a relative speed between the own vehicle 500 and a side vehicle (adjacent vehicle) can be acquired, and an acceleration of the own vehicle 500 may be corrected on the basis of the relative speed of the side vehicle.

The monitoring region 530 may also include the rear side of the own vehicle 500. In a case where the rear side of the own vehicle 500 cannot be detected by the above-described sensors, the monitoring region 530 may be expanded by adding another sensor such as an imaging sensor, a laser radar, or a LiDAR. As a result, a relative speed between the own vehicle 500 and a following vehicle can be acquired, and the acceleration of the own vehicle 500 may be corrected on the basis of the relative speed of the following vehicle. The following vehicle is not limited to a following vehicle in the own vehicle lane 510B, and may include a following vehicle in the adjacent lane 510A.

In a case where the monitoring region 530 includes the lateral side and/or the rear side of the own vehicle 500, a front portion may be managed as a first monitoring region, a side portion may be managed as a second monitoring region, and a rear portion may be managed as a third monitoring region. In this case, two or three of the first to third monitoring regions may overlap.

The same applies to the embodiment in FIGS. 9(A) to 10(D).

Although the embodiments of the present invention have been described in detail above, the present invention is not limited to the above embodiments, and various design changes can be made without departing from the concept of the present invention described in the claims. For example, the above-described embodiments have been described in detail in order to describe the present invention in an easy-to-understand manner, and are not necessarily limited to those having all the described configurations. A part of the configuration of one embodiment can be replaced with a configuration of another embodiment, and a configuration of another embodiment can be added to a configuration of one embodiment. It is possible to add, delete, and replace other configurations for a part of the configuration of each embodiment.

REFERENCE SIGNS LIST 100 vehicle (own vehicle)
108 vehicle control device
120, 121, 122 imaging sensor (imaging unit)
123, 124 distance sensor
200 vehicle control device
201 own vehicle position estimation unit
202 external recognition information conversion unit
203 inter-vehicle distance calculation unit
204 relative speed calculation unit
205 lane change detection unit (lane change detection unit)
206 target acceleration calculation unit (acceleration/deceleration control unit)
207 operation control unit
230 imaging sensor (imaging unit)
231 distance sensor
235 communication device
300 vehicle (own vehicle)
301 vehicle (preceding vehicle)
310A adjacent lane
310B own vehicle lane
310C adjacent lane
320A to 320D white line
400 vehicle (own vehicle)
401 vehicle (preceding vehicle)
402, 403, 404 vehicle (adjacent vehicle)
410A adjacent lane
410B own vehicle lane
410C adjacent lane
420A to 420D white line
430 monitoring region
500 vehicle (own vehicle)
501 vehicle (preceding vehicle)
502 vehicle (adjacent vehicle)

510A adjacent lane
510B own vehicle lane
510C adjacent lane
520A to 520C white line
530 monitoring region
540 white line threshold value
900 vehicle (own vehicle)
901 vehicle (preceding vehicle)
902 vehicle (adjacent vehicle)
910A adjacent lane
910B own vehicle lane
910C adjacent lane
920A to 920C white line
930 monitoring region
941 first white line threshold value
942 second white line threshold value
1000 vehicle (own vehicle)
1001 vehicle (preceding vehicle)
1002 vehicle (adjacent vehicle)
1010A adjacent lane
1010B own vehicle lane
1010C adjacent lane
1020A to 1020C white line
1030 monitoring region
1041 first white line threshold value
1042 second white line threshold value

The invention claimed is:

1. A vehicle control device that automatically controls a speed of an own vehicle, the vehicle control device comprising:
a controller configured to:
detect a preceding vehicle relationship value that is a relative relationship value in an advancing direction between a preceding vehicle traveling immediately in front of the own vehicle in an own vehicle lane in which the own vehicle is traveling and the own vehicle;
control an acceleration or a deceleration of the own vehicle on the basis of the preceding vehicle relationship value;
detect an adjacent vehicle relationship value that is a relative relationship value in the advancing direction between an adjacent vehicle traveling in an adjacent lane adjacent to the own vehicle lane in the same direction as the own vehicle and the own vehicle; and
detect cut-in of the adjacent vehicle to the own vehicle lane;
determine a possibility of cut-in of the adjacent vehicle immediately in front of the own vehicle on the basis of the adjacent vehicle relationship value in the advancing direction; and
correct the acceleration or the deceleration of the own vehicle on the basis of the possibility of the cut-in that is determined on the basis of the adjacent vehicle relationship value in the advancing direction,
wherein the adjacent vehicle relationship value is a relative speed, a relative distance, a relative acceleration, or a relative position between the adjacent vehicle and the own vehicle in the advancing direction, and
wherein the controller is further configured to:
correct the acceleration or the deceleration of the own vehicle when the adjacent vehicle is at a cut-in possible position and a time for which the relative speed, the relative distance, the relative acceleration, or the relative position indicates that the relative position is constant exceeds a first time threshold value.

2. The vehicle control device according to claim 1, wherein the controller is further configured to:
detect the cut-in of the adjacent vehicle on the basis of a relative position between a white line between the adjacent lane and the own vehicle lane and the adjacent vehicle or a lateral direction relative position between the adjacent vehicle and the own vehicle.

3. The vehicle control device according to claim 1, wherein the controller is further configured to:
set a monitoring region for monitoring the possibility of the cut-in, and
a range of the monitoring region in the advancing direction is set between the preceding vehicle and the own vehicle.

4. The vehicle control device according to claim 1, wherein the controller is further configured to:
determine the possibility of the cut-in of the adjacent vehicle on the basis of a lateral direction relative position between a white line between the adjacent lane and the own vehicle lane and the adjacent vehicle or a lateral direction relative position between the adjacent vehicle and the own vehicle.

5. The vehicle control device according to claim 1, wherein after correction of the acceleration or the deceleration of the own vehicle based on the adjacent vehicle relationship value in the advancing direction is started, the controller is further configured to cancel the correction of the acceleration or the deceleration of the own vehicle when a continuous time for which the adjacent vehicle relationship value indicates that the adjacent vehicle is in a cut-in possible position immediately in front of the own vehicle exceeds a second time threshold value.

6. The vehicle control device according to claim 1, wherein
the controller is further configured to:
set a first distance threshold value related to a lateral direction relative distance between a white line between the adjacent lane and the own vehicle lane and the adjacent vehicle or a lateral direction relative distance between the adjacent vehicle and the own vehicle, and
correct the acceleration or the deceleration of the own vehicle by determining that there is a possibility of the cut-in of the adjacent vehicle when the adjacent vehicle exceeds the first distance threshold value, and
the controller is further configured to:
set a second distance threshold value smaller than the first distance threshold value with respect to the lateral direction relative distance between the white line and the adjacent vehicle or the lateral direction relative distance between the adjacent vehicle and the own vehicle, and
set the adjacent vehicle as a new preceding vehicle by determining that the cut-in of the adjacent vehicle to the own vehicle lane is started when the adjacent vehicle exceeds the second distance threshold value.

7. The vehicle control device according to claim 6, wherein the controller is further configured to:
cancel correction of the acceleration or the deceleration of the own vehicle caused by exceeding the first distance threshold value when the adjacent vehicle moves away from the first distance threshold value or a third distance threshold value equal to or greater than the first distance threshold value after the adjacent vehicle exceeds the first distance threshold value and before the adjacent vehicle exceeds the second distance threshold value.

8. The vehicle control device according to claim 1, wherein the controller is further configured to:
acquire a front image of the own vehicle; and
detect a white line between the adjacent lane and the own vehicle lane on the basis of the front image,
wherein the controller is configured to detect a white line near the own vehicle that is not imaged on the basis of a continuous behavior of the own vehicle or a comparison between past and current front images.

9. The vehicle control device according to claim 1, wherein in a case where a direction indicator of the adjacent vehicle indicates a lane change to the own vehicle lane, the controller is configured to correct the acceleration or the deceleration of the own vehicle.

10. The vehicle control device according to claim 1, wherein in a case where a cut-in request is received from the adjacent vehicle through inter-vehicle communication, the controller is configured to correct the acceleration or the deceleration of the own vehicle.

11. A vehicle control device that automatically controls a speed of an own vehicle, the vehicle control device comprising:
a controller configured to:
detect a preceding vehicle relationship value that is a relative relationship value in an advancing direction between a preceding vehicle traveling immediately in front of the own vehicle in an own vehicle lane in which the own vehicle is traveling and the own vehicle;
control an acceleration or a deceleration of the own vehicle on the basis of the preceding vehicle relationship value;
detect an adjacent vehicle relationship value that is a relative relationship value in the advancing direction between an adjacent vehicle traveling in an adjacent lane adjacent to the own vehicle lane in the same direction as the own vehicle and the own vehicle;
detect cut-in of the adjacent vehicle to the own vehicle lane;
determine a possibility of cut-in of the adjacent vehicle immediately in front of the own vehicle on the basis of the adjacent vehicle relationship value in the advancing direction; and
correct the acceleration or the deceleration of the own vehicle on the basis of the possibility of the cut-in that is determined on the basis of the adjacent vehicle relationship value in the advancing direction,
wherein the adjacent vehicle relationship value includes at least two of a relative speed, a relative distance, a relative acceleration, and a relative position between the adjacent vehicle and the own vehicle in the advancing direction, and
even in a case where the adjacent vehicle is at a cut-in possible position and one of the relative speed, the relative distance, the relative acceleration, or the relative position indicates a state in which the relative position is constant, the controller is configured to restrict correction of the acceleration or the deceleration of the own vehicle on the basis of the adjacent vehicle relationship value in a case where another value indicates a state in which the relative position is not constant.

12. The vehicle control device according to claim 1, wherein in a case where the preceding vehicle is being decelerated, restrict correction of the acceleration or the deceleration of the own vehicle based on the adjacent vehicle relationship value.

13. The vehicle control device according to claim 1, wherein the controller is further configured to:
when the cut-in of the adjacent vehicle to the own vehicle lane is detected and the adjacent vehicle is set as a new preceding vehicle, execute inter-vehicle distance control for controlling the acceleration or the deceleration of the own vehicle such that an inter-vehicle distance between the new preceding vehicle and the own vehicle is maintained within a certain range.

14. The vehicle control device according to claim 13, wherein in the inter-vehicle distance control with respect to the new preceding vehicle, the controller is configured to
increases the inter-vehicle distance at a first deceleration in a case where a relative speed between the new preceding vehicle and the own vehicle is within a first speed range including zero, and
increases the inter-vehicle distance at a second deceleration having an absolute value greater than the first deceleration in a case where the relative speed between the new preceding vehicle and the own vehicle is not within the first speed range.

\* \* \* \* \*